(12) United States Patent
Krishnamurthy et al.

(10) Patent No.: US 11,397,609 B2
(45) Date of Patent: Jul. 26, 2022

(54) APPLICATION/CONTEXT-BASED MANAGEMENT OF VIRTUAL NETWORKS USING CUSTOMIZABLE WORKFLOWS

(71) Applicant: Nicira, Inc., Palo Alto, CA (US)

(72) Inventors: Rajiv Krishnamurthy, Palo Alto, CA (US); Laxmikant Gunda, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 16/915,589

(22) Filed: Jun. 29, 2020

(65) Prior Publication Data

US 2020/0334068 A1    Oct. 22, 2020

Related U.S. Application Data

(63) Continuation of application No. 15/482,400, filed on Apr. 7, 2017, now Pat. No. 10,698,714.

(51) Int. Cl.
| | |
|---|---|
| *G06F 15/173* | (2006.01) |
| *G06F 9/455* | (2018.01) |
| *H04L 9/40* | (2022.01) |
| *H04L 43/026* | (2022.01) |
| *H04L 41/0806* | (2022.01) |
| *H04L 41/0893* | (2022.01) |

(Continued)

(52) U.S. Cl.
CPC .......... *G06F 9/45558* (2013.01); *G06F 11/30* (2013.01); *H04L 41/0806* (2013.01); *H04L 41/0893* (2013.01); *H04L 43/026* (2013.01); *H04L 63/20* (2013.01); *H04L 67/10* (2013.01); *G06F 2009/45587* (2013.01); *G06F 2009/45591* (2013.01); *G06F 2009/45595* (2013.01); *H04L 41/12* (2013.01); *H04L 41/22* (2013.01)

(58) Field of Classification Search
CPC ... H04L 63/20; H04L 41/0893; H04L 43/026; H04L 41/22; H04L 43/045; H04L 63/02
USPC .................................................. 709/223, 224
See application file for complete search history.

(56) References Cited

U.S. PATENT DOCUMENTS

| | | | |
|---|---|---|---|
| 2016/0275303 A1* | 9/2016 | Narayanaswamy | ........................ H04L 63/1458 |
| 2016/0359872 A1 | 12/2016 | Yadav et al. | |

(Continued)

OTHER PUBLICATIONS

Revelle, "Hypervisors and Virtual Machines Implementation Insights on the x86 Architecture", Oct. 2011, 6 pages.

(Continued)

*Primary Examiner* — Wing F Chan
*Assistant Examiner* — Andrew Woo
(74) *Attorney, Agent, or Firm* — Hanley, Flight & Zimmerman, LLC

(57) ABSTRACT

Methods and apparatus for application and/or context-based management of virtual networks using customizable workflows are disclosed. An example apparatus includes a context engine to monitor data traffic from a virtual machine in a data plane of a virtual network to capture context information to identify an application executing on the virtual machine; and a policy manager to receive the context information to instantiate an application entity corresponding to the application in a policy plane of the virtual network and to generate a policy associated with the application entity in the policy plane of the virtual network, the policy and the application entity enabling monitoring and management of the application via the policy plane.

21 Claims, 31 Drawing Sheets

(51) Int. Cl.
*G06F 11/30* (2006.01)
*H04L 67/10* (2022.01)
*H04L 41/22* (2022.01)
*H04L 41/12* (2022.01)

(56) References Cited

U.S. PATENT DOCUMENTS

2017/0366605 A1* 12/2017 Chang ................. H04L 67/1008
2018/0295036 A1    10/2018 Krishnamurthy et al.

OTHER PUBLICATIONS

VMware "Performance Comparison of Hypervisors", 2007, 22 pages.

Roie Ben Haim, "NSX Distributed Firewall Deep Dive", Apr. 30, 2015, retrieved from http://www.routetocloud.com/2015/04/nsx-distributed-firewall-deep-dive/ on Aug. 24, 2017, 60 pages.

VMware, "VMware® NSX Network Virtualization Design Guide Deploying VMware NSX with Cisco UCS and Nexus 7000", 2013, 29 pages.

United States Patent and Trademark Office,"Notice of Allowance," issued in connection with U.S. Appl. No. 15/482,400, dated Feb. 26, 2020, 25 pages.

United States Patent and Trademark Office,"Advisory Action," issued in connection with U.S. Appl. No. 15/482,400, dated Jan. 22, 2020, 7 pages.

United States Patent and Trademark Office, "Final Office Action," issued in connection with U.S. Appl. No. 15/482,400, dated Oct. 31, 2019, 21 pages.

United States Patent and Trademark Office, "Non-Final Office Action," issued in connection with U.S. Appl. No. 15/482,400, dated Apr. 19, 2019, 35 pages.

* cited by examiner

FIG. 12

NSX 1102

Application Monitoring

View Security Group [Production HR ▽]   5/23/2017 - 6/20/2017   Manage Data Collection
(Currently Monitoring: HR Data)

SUMMARY

Summary for S

Virtual Machine

VM

Flows

7   Internet Flow

Manage Data Collection for Security Groups   1202   Total of 378 Security Groups.

! Only Security Groups with 20 or less Virtual machines are supported. Only one Security Group can be monitored at a time.

Find Security Group:

*Type in the name*

*Finance App*
*Finland*

Security Group currently being monitored:

● HR data                    [X]

Number of VMs: 19

Collected        12/12/2016-ON-GOING
Data Sets:       12/12/2015-12/1/2016
                 12/12/2015-12/1/2016

FIG. 14

NSX 1102

Application Monitoring

View Security Group [Production HR ▽]  5/23/2017 – 6/20/2017   Manage Data Collection
(Currently Monitoring: HR Data)

SUMMARY  FLOWS

42 VMs | Altogether 95 Flows | 7 Internet Flows | 17 Flows within Security Group | 10 East – West Flows Filters

1400

42/42 Virt...

VM Application Details:  VM:23.22.12.1.exs01.net  1410

*Type in search word* 1416    Sort by ▽ 1418

21 apps running in the VM
1412   1414

| Chrome | 2.12.4 | lorem1 | View Traffic |
| AppName | 2.12.4 | lorem2 | View Traffic |
| Sharepoint | 2.12.4 | lorem3 | View Traffic |
| Sharepoint | 2.12.1 | lorem4 | View Traffic |

VMS and Flows Details 3.233.2
Internet
11.23.23.1
11.23.23.1
22.4.56.21

FIG. 20

NSX 1102

2000

ITEM 1
ITEM 2
ITEM 3
PROCESS DISCOVERY

THIS TABLE WILL HAVE FULL FILTERING AND SORTING CAPABILITES PER COLUM PER CLARITY STYLE

WEB TIER PROFILE DETAILS                                                CLOSE (X)

<PROFILE CRITERIA GOES HERE>                2002

2004

| PROCESS NAME | VERSION | #VALUE | TYPE | VMS |
|---|---|---|---|---|
| APACHE.EXE | | | | MULTIPLE |
| INETMGR.EXE | | | | VMNAME1 |
| NAME2 | | | | |
| NAME3 | | | | |
| | | | | PAGNATION |

APPLICATION/CONTEXT-BASED MANAGEMENT OF VIRTUAL NETWORKS USING CUSTOMIZABLE WORKFLOWS

CROSS-REFERENCE TO RELATED APPLICATIONS

This patent claims priority as a continuation to U.S. Non-Provisional application Ser. No. 15/482,400, entitled "APPLICATION/CONTEXT-BASED MANAGEMENT OF VIRTUAL NETWORKS USING CUSTOMIZABLE WORKFLOWS", which was filed on Apr. 7, 2017, and is hereby incorporated herein by reference in its entirety.

FIELD OF THE DISCLOSURE

The present disclosure relates generally to virtual networks and, more particularly, to methods and apparatus for application and/or context-based management of virtual networks using customizable workflows.

BACKGROUND

Virtualizing computer systems provide benefits such as an ability to execute multiple computer systems on a single hardware computer, replicating computer systems, moving computer systems among multiple hardware computers, and so forth. Virtualizing networks can provide additional benefits to leverage network infrastructure for multiple applications.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the platform enables developers to build, deploy, and manage the lifecycle of a web application (or any other type of networked application) at a greater scale and at a faster pace than ever before.

Virtualized computing environments may include many processing units (e.g., servers). Other components include storage devices, networking devices (e.g., switches), etc. Current computing environment configuration relies on much manual user input and configuration to install, configure, and deploy the components of the computing environment. Particular applications and functionality must be placed in particular places (e.g., network layers) or the application/functionality will not operate properly.

BRIEF DESCRIPTION OF THE DRAWINGS

FIGS. 11-20 illustrate example graphical user interfaces in accordance with the presently described technology.

DETAILED DESCRIPTION

Figure 1:
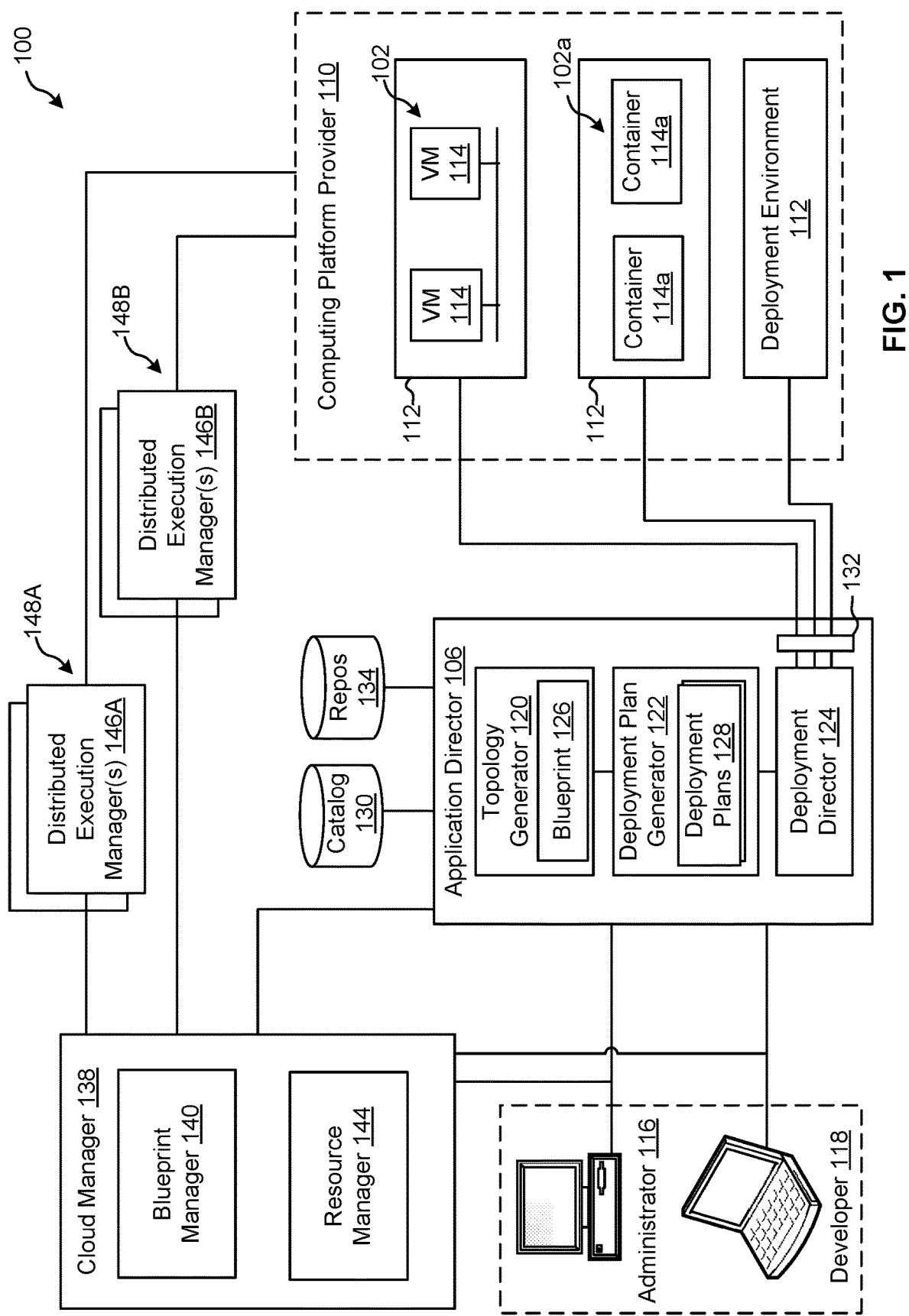
FIG. 1 depicts an example system constructed in accordance with the teachings of this disclosure for managing a computing platform.

Virtual computing is based on the deployment of many physical resources across a network, virtualizing the physical resources into virtual resources, and provisioning the virtual resources to perform computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Virtualized computing platforms may provide many powerful capabilities for performing computing operations. However, taking advantage of these computing capabilities manually may be complex and/or require significant training and/or expertise. Prior techniques to providing computing platforms and services often require customers to understand details and configurations of hardware and software resources to establish and configure the cloud computing platform. Example methods and apparatus disclosed herein facilitate the management of virtual machine resources and virtual networks in software-defined data centers and other virtualized computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

Virtual networks associated with virtual machines can be managed via policies and rules. A network virtualization manager provides an infrastructure for consumption by an executing application (e.g., executing via a VM, etc.). Virtual networks are provisioned for applications being deployed in a data center. For example, network layers or planes and associated services are configured to allow an application VM to executed in one or more network layers. While prior implementations provision and configure network layers and services separately and manually, certain examples provision and configure network layers and services via automated definition and discovery to correlate tiered applications, determine information flow, and automatically define an application entity in a particular network layer (e.g., policy layer, management/policy layer, etc.).

Example methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud, cloud-like, and/or other virtual computer/network management systems (e.g., the vCloud Automation Center (vCAC) from VMware®, the vRealize Automation Cloud Automation Software from VMware®, VMware NSX® for the Software-Defined Data Center (SDDC), VMware ESXi® enterprise hypervisor, etc.), interfaces, portals, etc. disclosed herein may be utilized individually and/or in any combination. For example, all or a subset of the described improvements may be utilized.

In certain examples, when starting up a cloud computing environment or adding resources to an already established cloud computing environment, data center operators struggle to offer cost-effective services while making resources of the infrastructure (e.g., storage hardware, computing hardware, and networking hardware) work together to achieve pain-free installation/operation and optimizing the resources for improved performance. Prior techniques for establishing and maintaining data centers to provide cloud and/or cloud-like computing services often require customers to understand details and configurations of hardware resources to establish workload domains in which to execute customer services. In certain examples, workload domains are mapped to a management cluster deployment (e.g., a vSphere cluster of VMware, Inc.) in a single rack deployment in a manner that is relatively easier to understand and operate by users than prior techniques. Thus, as additional racks are added to a system, cross-rack clusters become an option. This enables creating more complex configurations for workload domains as there are more options for deployment as well as additional management cluster capabilities that can be leveraged. Examples disclosed herein facilitate making workload domain configuration and management easier than prior techniques.

A management cluster is a group of physical machines and virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources.

Virtual networks can be used with virtual machines in SDDC and/or other cloud or cloud-like computing environments. Virtual networks can be managed (e.g., using NSX sold by VMware, Inc.) using policies and rules. Network and other infrastructure is configured for consumption by applications. Virtual network(s) are provisioned for such applications to be deployed in the SDDC.

Manual configuration of Open Systems Interconnect (OSI) network layers (e.g., Layer 1 (L1), Layer 2 (L2), Layer 3 (L3), etc.) and associated individual services, including distributed firewall (DFW), load balancing (LB), etc., is a complicated and time-consuming series of tasks. Then, the application VM must be placed in the L2/L3 network. Certain examples streamline and improve such network and service configuration and application VM placement by defining applications in the policy or management layer. Certain examples described herein define an application entity in the policy/management layer. An application entity is a logical manageable entity that includes a group of VMs on which the application will be executing.

Certain examples create logical overlay networks such that any two VMs, each being at any arbitrary location in the entire datacenter (and possible across multiple datacenters) can think that they are on the same physical network connected by a single switch between them. Such a logical overlay network is implemented by a network tunnel that is established between the hosts on which the two VMs reside. When the first VM sends out a packet to the second VM, its L2 header is encapsulated by an L3 header addressed to the second host, and then another L2 header for the first hop towards that second host. The destination host then decapsulates the packet and gives the inner, original packet to the second VM. The encapsulation, decapsulation, and exchange are orchestrated by a central controller cluster which knows where each VM is and translates logical switch configuration to physical switch configurations for programming a physical forwarding plane with instructions to encapsulate and forward the packet according to the translations. A management server receives user configuration inputs such as logical network configuration and communicates this to the controller cluster via application programming interfaces (APIs). The controller cluster also handles higher-level constructs such as logical L3 routers, which are each distributed across the hosts that have VMs that are connected to the logical router. Each logical router can perform functions of a physical router, including network address translation (NAT), source network address translation (SNAT), access control list (ACL), etc. Firewalls, load balancers, etc., can be implemented, and firewall rules can be applied at each port of the virtual switch according to configurations. In certain examples, policy rules can be translated into firewall rules using context information. Firewall rules can be used to regulate access, permission, etc.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor (e.g., a virtual machine monitor (VMM) and/or other software, hardware, and/or firmware to create and execute virtual machines) to provide virtual hardware resources to a virtual machine. A computer or other computing device on which the hypervisor runs is referred to as a host machine or host computer, and each virtual machine running on the host machine is referred to as a guest machine. The hypervisor provides guest operating systems with a virtual operating platform and manages execution of the guest operating systems. In certain examples, multiple operating system instances can share virtualized hardware resources of the host computer.

In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical RAM with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a computing platform (e.g., a cloud computing platform and/or other distributed computing platform, etc.). The example system 100 includes an application director 106 and a manager 138 to manage a computing platform provider 110 as described in more detail below. As described herein, the example system 100 facilitates management of the provider 110 and does not include the provider 110. Alternatively, the system 100 can be included in the provider 110.

The computing platform provider 110 provisions virtual computing resources (e.g., virtual machines, or "VMs," 114) that may be accessed by users of the computing platform 110 (e.g., users associated with an administrator 116 and/or a developer 118) and/or other programs, software, device. etc.

An example application 102 implemented via the computing platform provider 110 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example computing platform provider 110 may provide multiple deployment environments 112, for example, for development, testing, staging, and/or production of applications. The administrator 116, the developer 118, other programs, and/or other devices may access services from the computing platform provider 110, for example, via REST (Representational State Transfer) APIs (Application Programming Interface) and/or via any other client-server communication protocol. Example implementations of a REST API for cloud and/or other computing services include a vCloud Administrator Center™ (vCAC) and/or vRealize Automation™ (vRA) API and a vCloud Director™ API available from VMware, Inc. The example computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the computing platform provider 110 via an interface 132 to provision and configure the VMs 114 in the deployment environment 112. The example interface 132 of FIG. 1 provides a communication abstraction layer by which the application director 106 may communicate with a heterogeneous mixture of provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example manager 138 of FIG. 1 interacts with the components of the system 100 (e.g., the application director 106 and the provider 110) to facilitate the management of the resources of the provider 110. The example manager 138 includes a blueprint manager 140 to facilitate the creation and management of multi-machine blueprints and a resource manager 144 to reclaim unused cloud resources. The manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of computing resources of the provider 110 that are no longer being activity utilized. Automated reclamation may include identification, verification and/or reclamation of unused, underutilized, etc. resources to improve the efficiency of the running cloud infrastructure.

Network Virtualization Examples

Software-defined networking (SDN) provides computer networks in which network behavior can be programmatically initialized, controlled, changed, and managed dynamically via open interface(s) and abstraction of lower-level functionality. As with VMs, SDN or network virtualization addresses the problem that the static architecture of traditional networks does not support the dynamic, scalable computing and storage needs of more modern computing environments such as data centers. By dividing a network into a set of planes (e.g., control plane, data plane, management or policy plane, etc., a system that determines where network traffic is sent (e.g., an SDN controller, or control plane) can be separated from underlying systems that forward traffic to the selected destination (e.g., the data plane, etc.).

In a network, a plane is an architectural component or area of operation for the network. Each plane accommodates a different type of data traffic and runs independently on top of the network hardware infrastructure. The data plane (sometimes also referred to as the user plane, forwarding plane, carrier plane, or bearer plane) carries network user traffic. The control plane carries signaling data traffic. Control packets carried by the control plane originate from or are destined for a router, for example. The management or policy plane, which carries administrative data traffic, is considered a subset of the control plane.

In conventional networking, the three planes are implemented in the network firmware of routers and switches. SDN decouples the data and control planes to implement the control plane in software rather than network hardware. Software implementation enables programmatic access and adds flexibility to network administration. For example, network traffic can be shaped via the control plane from a centralized control console without having to adjust individual network switches. Additionally, switch rules can be dynamically adjusted such as to prioritize, de-prioritize, block, etc., certain packet types, etc.

Each network plane is associated with one or more data transfer/communication protocols. For example, interfaces, Internet Protocol (IP) subnets and routing protocols are configured through management plane protocols (e.g., Command Line Interface (CLI), Network Configuration Protocol (NETCONF), Representational State Transfer (RESTful) application programming interface (API), etc.). In certain examples, a router runs control plane routing protocols (e.g., OSPF, EIGRP, BGP, etc.) to discover adjacent devices and network topology information. The router inserts the results of the control-plane protocols into table(s) such as a Routing Information Base (RIB), a Forwarding Information Base (FIB), etc. Data plane software and/or hardware (e.g., application specific integrated circuits (ASICs), field programmable gate arrays (FPGAs), etc.) use FIB structures to forward data traffic on the network. Management/policy plane protocols, such as Simple Network Management Protocol (SNMP), can be used to monitor device operation, device performance, interface counter(s), etc.

A network virtualization platform decouples the hardware plane from the software plane such that the host hardware plane can be administratively programmed to assign its resources to the software plane. Such programming allows for virtualization of central processing unit (CPU) resources, memory, other data storage, network input/output (IO) interface, and/or other network hardware resource. Virtualization of hardware resources facilitates implementation of a plurality of virtual network applications such as firewalls, routers, Web filters, intrusion prevention systems, etc., contained within a single hardware appliance. Thus, logical or "virtual" networks can be created on top of a physical network, and the virtual networks can have the same properties as the underlying physical network.

Within a network virtualization environment, applications are interconnected by a virtual switch, rather than a physical, hardware-based network switch. Virtual switches are software-based "switches" that involve movement of packets up and down a software stack which relies on the same processor(s) that are being used to drive the applications. The virtual switch (also referred to as a soft switch or vSwitch) can be implemented on each server in a virtual network, and packets can be encapsulated across multiple vSwitches that forward data packets in a network overlay on top of a physical network as directed by a network controller that communicates to the vSwitch via a protocol such as Open-Flow, etc.

Thus, in a close analogy to a virtual machine, a virtualized network is a software container that presents logical network components (e.g., logical switches, routers, firewalls, load balancers, virtual private networks (VPNs), etc.) to connected workloads. The virtualized networks are programmatically created, provisioned and managed, with the underlying physical network serving as a simple packet-forwarding backplane for data traffic on the virtual network. Network and security services are allocated to each VM according to its needs, and stay attached to the VM as the VM moves among hosts in the dynamic virtualized environment. A network virtualization platform (e.g., VMware's NSX, etc.) deploys on top of existing physical network hardware and supports fabrics and geometries from a plurality of vendors. In certain examples, applications and monitoring tools work smoothly with the network virtualization platform without modification.

In certain examples, the virtual network introduces a new address space enabling logical networks to appear as physical networks. For example, even if the physical network is L3 (Layer 3), an L2 (Layer 2) virtual network can be created. As another example, if the physical network is L2, an L3 virtual network can be created. When a data packet leaves a VM, for example, the packet is sent to the physical network via lookup from the virtual network. The packet can then be transported back from the physical network to the virtual network for further computation and/or other processing at its destination (e.g., virtual network address spaces can be mapped to a physical address space along a network edge in real time or substantially real time given system processing, transmission, and/or data storage latency, etc.). Thus, the virtual network is decoupled from the physical network. An abstraction layer is created and managed between end systems and the physical network infrastructure which enables creation of logical networks that are independent of the network hardware.

For example, two VMs located at arbitrary locations in a data center (and/or across multiple data centers, etc.) can be connected by a logical overlay networks such that the two VMs think that they are on the same physical network connected by a single switch between the VMs. The overlay network is implemented by a network tunnel that is established between the host computers on which the two VMs reside. When the first VM sends out a packet to the second VM, the packet's L2 header is encapsulated by an L3 header addressed to the second host, and then another L2 header is generated for the first hop toward the second host for the second VM (e.g., the destination host). The destination host then unpackages the packet and provides the inner, original packet to the second VM. Routing from the first VM to the second VM can be orchestrated by a central controller cluster which knows a location for each VM and translates logical switch configuration to physical switch configuration to program the physical forwarding plane with instructions to encapsulate and forward the packet according to the translation(s). A management server receives user configuration input, such as logical network configuration, and communicates the input to the controller cluster via one or more APIs, for example.

The controller cluster also handles higher-level constructs such as logical L3 routers, which are distributed across the hosts that have VMs that are connected to the logical router. Each logical router can include capabilities of physical routers, including network address translation (NAT), secure NAT (SNAT), access control list (ACL), etc. The controller cluster can also implement distributed firewalls, load balancers, etc. Firewall rules can be applied at each port of the virtual switch according to a configuration, for example.

Certain examples provide a novel architecture to capture contextual attributes on host computers that execute one or more virtual machines and consume captured contextual attributes to perform services on the host computers. Certain examples execute a guest-introspection (GI) agent on each machine from which contextual attributes are to be captured. In addition to executing one or more VMs on each host computer, certain examples also execute a context engine and one or more attribute-based service engines on each host computer. Through the GI agents of the VMs on a host, the context engine of the host, in some examples, collects contextual attributes associated with network events and/or process events on the VMs. The context engine then provides the contextual attributes to the service engines, which, in turn, use these contextual attributes to identify service rules that specify context-based services to perform on processes executing on the VMs and/or data message flows sent by or received for the VMs.

As used herein, data messages refer to a collection of bits in a particular format sent across a network. The term data message can be used herein to refer to various formatted collections of bits that may be sent across a network, such as Ethernet frames, IP packets, TCP segments, UDP datagrams, etc. Also, as used herein, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Network Plane System and Workflow Examples

Figure 2:
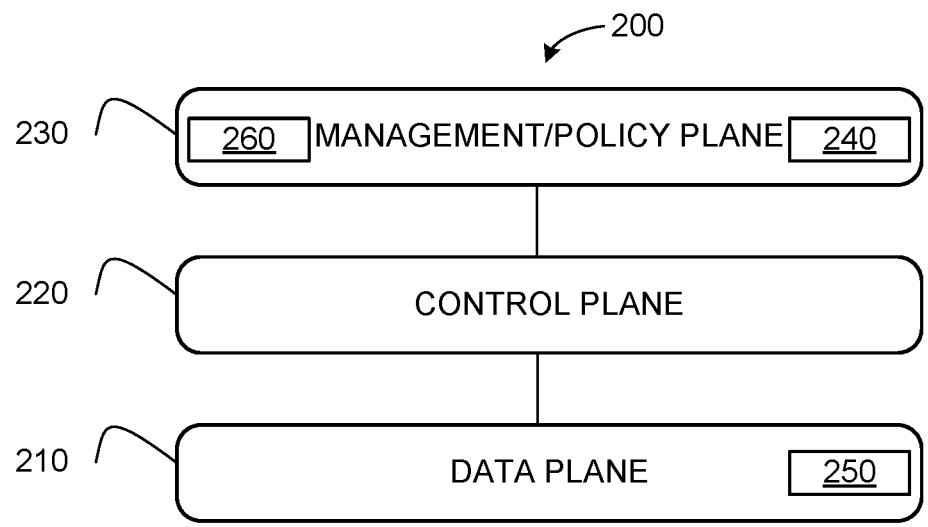
FIGS. 2-3 illustrate example network layouts.

Networks, including virtual networks, can be logically divided into a plurality of planes or layers. FIG. 2 illustrates an example network layout 200 including a data plane 210, a control plane 220, and a management/policy plane 230. As shown in the example of FIG. 2, the data plane 210 facilitates switching and data packet forwarding (e.g., according to a forwarding table, etc.), etc. The data plane 210 determines network address translation, neighbor address, netflow accounting, access control list (ACL) logging, error signaling, etc. The control plane 220 facilitates routing including static routes, neighbor information, IP routing table, link state, etc. Protocols executing on the control plane 220 facilitate routing, interface state management, connectivity management, adjacent device discovery, topology/reachability information exchange, service provisioning, etc. The management/policy plane 230 facilitates network configuration and interfacing, including command line interface (CLI), graphical user interface (GUI), etc.

While the control plane 220 and data plane 210 accommodate networking constructs such as routers, switches, and ports, these planes 210, 220 do not understand compute constructs such as applications, etc. Certain examples instantiate application entities in the management plane 230. Rather than manually tying applications to network behavior, certain examples provide a technological improvement to computing system and networking infrastructure and operations by automatically identify executing applications, instantiate corresponding application entities in the management plane 230, and tie applications to network interactions for display and/or interaction by an operator.

In certain examples, the infrastructure 100 can be leveraged to drive identification and management of applications and/or other resources at the policy layer. Certain examples enable definition of applications executing in a virtualized network environment in the policy layer. Certain examples facilitate definition of an application entity in the policy layer. The application entity is a logical manageable entity that includes a group of VMs 114 to execute the associated application.

In certain examples, a multi-tier application (e.g., a three-tier application, n-tier application, etc.) is divided into one group of VMs 114 per application tier. For example, a three-tier application (e.g., presentation tier, business logic tier, and data tier) has three VM 114 groups—one tier for Web presentation, one group for application logic, and one group for datastore.

Certain examples facilitate discovery of user logins via VMs 114 and associated applications executing to generate data and command flows via a context engine. The context engine discovers individual processes running within VMs 114 and/or users logging into the VMs 114. Process(es) and user(s) can be correlated into tiered application(s) that the policy layer has defined. Flow information of the user and/or application can be discovered as well as another user and/or application connected to the flow, for example.

For example, an L2/L3 network to which executing application(s) belong can be identified using a network virtualization manager (e.g., an API associated with VMware NSX®, etc.). Discovered information (e.g., user logins, activated VMs, running applications, flow information, etc.) can be visualized. Additionally, network(s) (e.g., L2/L3 networks, etc.) can be created, and application(s) can be placed in such network(s) based on the discovered information. Networking and security service(s) can be provided to these application(s). DFW, LB, antivirus (AV), and/or other partner service can be applied to user(s) and/or application(s) configured and/or discovered according to the network(s). In certain examples, the configuration can be saved as a template for reuse (e.g., by an administrator, through automated script execution, etc.) for a new user and/or application.

As described above, network virtualization functionality can be positioned in various planes of the network structure 200. For example, the context engine can be implemented in the management plane 230, data plane 210, and/or control plane 220.

In certain examples, the context engine can be implemented in the management plane 230 and the data plane 210. As shown in the example of FIG. 2, the context engine is implemented in two parts as a context engine management plane (MP) 240 and a context engine data plane (DP) 250. Together the context engine MP 240 and the context engine DP 250 perform the functions of the context engine.

In certain examples, a policy engine 260 (also referred to as a policy manager) and/or other operations and management component(s) can be implemented in the management plane 230, data plane 210, and/or control plane 220, for example. The policy engine 260 creates, stores, and/or distributes policy(-ies) to applications running on the virtual network(s) and VM(s) 114, for example.

In certain examples, the policy engine 260 creates rules based on VM 114 address and collects context information from guest VMs 114 and the network visualization manager to defined policies based on the captured content and other information. Using the policies, rules can be created based on user, application, etc. Application-based rules can be created via the policy engine 260, and the policy engine 260 can define application entities in the policy plane 230 based on applications running on the host 110.

Figure 3:
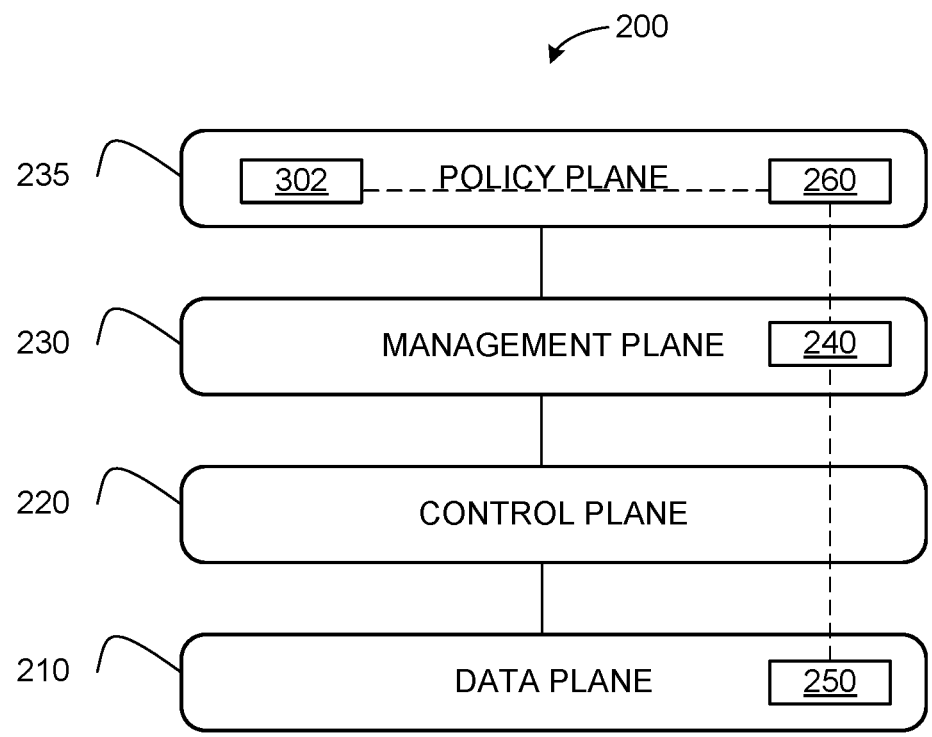

In certain examples, the management/policy plane 230 can be separated into the management plane 230 and a policy plane 235 (see, e.g., FIG. 3). In the example implementation of FIG. 3, the policy engine 260 resides in the policy plane 235, and the context engine MP 240 remains in the management plane 230. As shown in the example of FIG. 3, an application entity 302 can be defined in the policy plane 335 based on context information for processes running in the VMs 114 extracted by the context engine 240 and policies from the policy engine 260.

Figure 4:
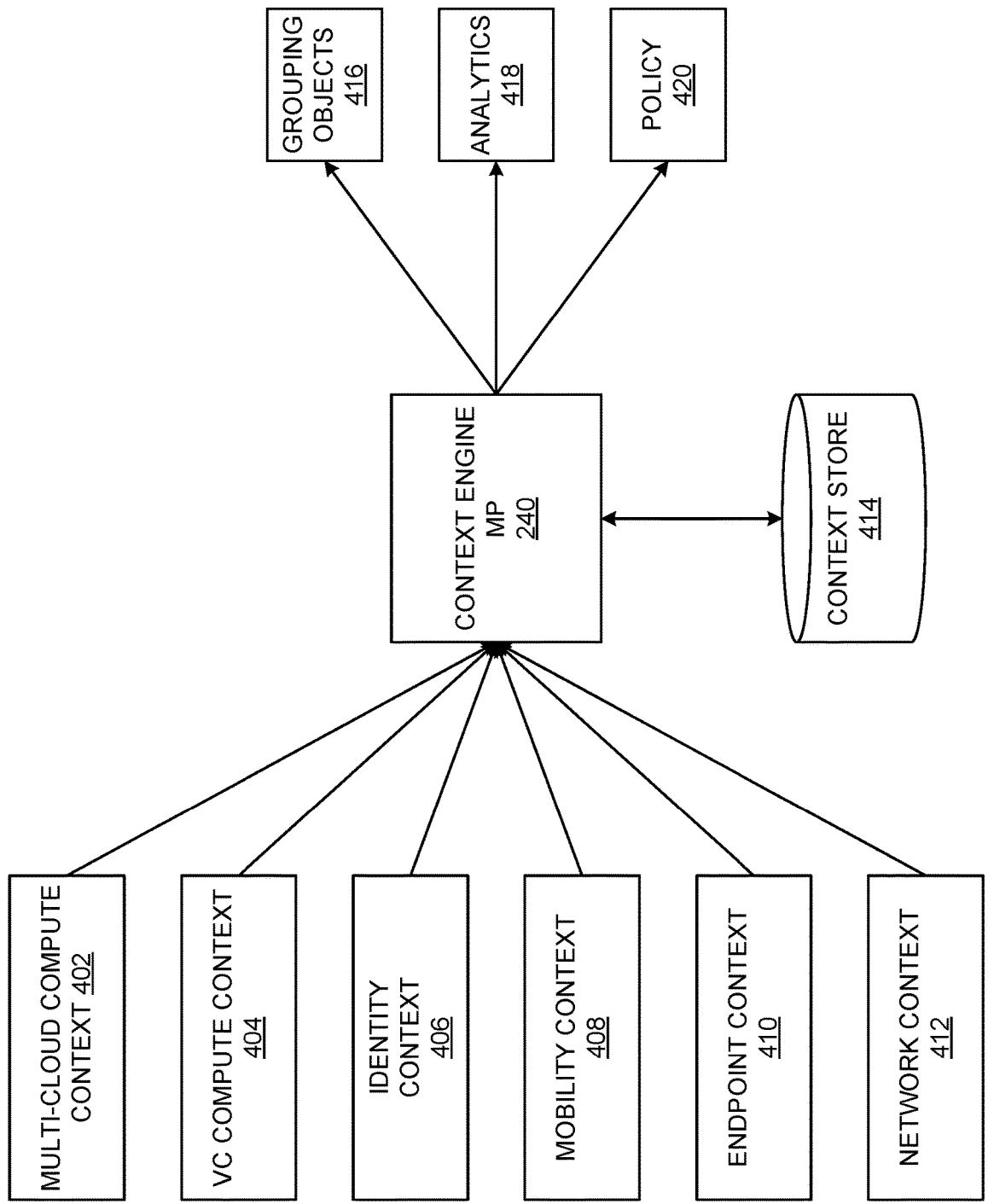
FIG. 4 shows example context gathered by the context engine from a plurality of sources in the management plane.

As shown in the example of FIG. 4, the context engine MP 240 gathers context from a plurality of sources in the management plane. Sources of context in the management plane 230 include multi-cloud compute context 402, virtual center (VC) compute context 404, identity context 406, mobility context 408, endpoint context 410, and network context 412, for example. In certain examples, the compute context includes multi-cloud context 402 from various cloud vendors such as Amazon, Azure, etc. Compute context can also include virtual center inventory 404 (e.g., CPU, memory, VM, operating system, etc.). In certain examples, identity context 406 includes user, group information, etc., from directory services such as Lightweight Directory Access Protocol (LDAP), Active Directory (AD), Keystone, other identity management, etc. Mobility or mobile context 808 includes location, Airwatch mobile device management, international mobile equipment identity (IMEI) code, etc. In certain examples, endpoint context 410 includes DNS, process, application inventory, etc. Network context 412 includes IP, Port, MAC, bandwidth, quality of service (QoS), congestion, latency, etc. Context gathered in the management plane 230 can be used to group objects for use by rules and policies, for example. For example, the context engine MP 240 can store context information in a context data store 414 and generate one or more outputs including grouping objects 416, analytics 418, and policy 420.

A second component of the context engine can be instantiated in the data plane 210 as the context engine DP 250. The context engine DP 250 gathers context in the data plane 210 from a thin client agent, for example. The data plane context includes information such as user context, process context, application inventory, system context, etc. User context includes user ID, group ID, etc. Process context includes name, path, libraries, etc. Application inventory includes product name, company name, installation path, etc. System context includes operating system information, hardware information, network configuration, etc. In certain examples, user and process context is gathered on a per flow basis from the guests. The application inventory and system context are gathered on a per VM 114 basis. Such contact information can be referred to as realized or runtime contexts, for example.

Various use cases can be satisfied by the context of a services. These services are implemented as plug-ins to the context engine DP 250. For example, services include application visibility, identity firewall (IDFW), application firewall, packet capture, process control, vulnerability scan, load balancer (LB), etc., for example, the application visibility plug-in gathers process context for flow and stores the information in the management plane. A user interface uses this information to visualize the flow between the VMs 114 and the processes running within the VM 114.

Figure 5:
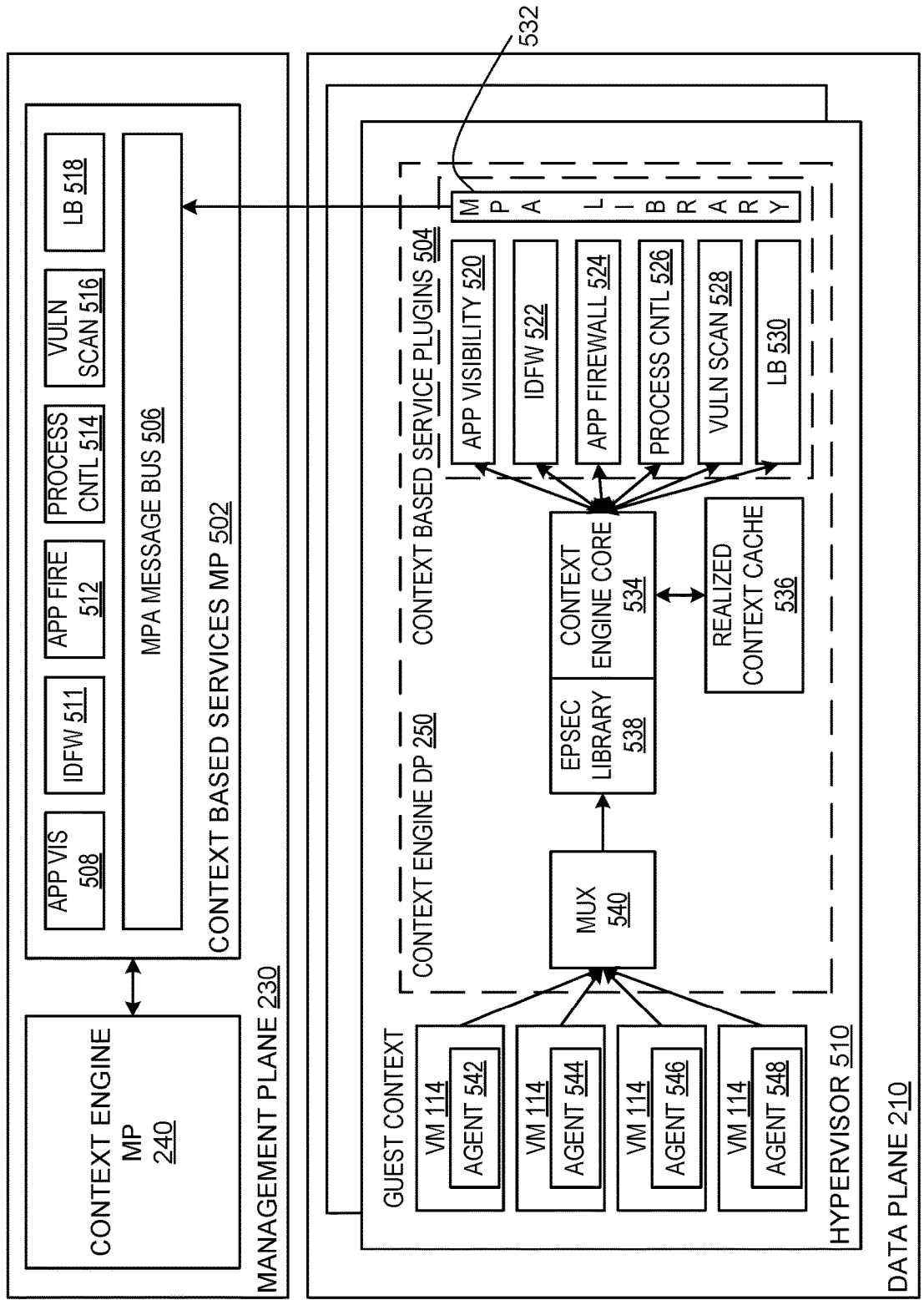
FIG. 5 illustrates an example relationship between the context engine MP (management plane) in the management plane and the context engine DP (data plane) in the data plane.

FIG. 5 illustrates an example relationship between the context engine MP 240 in the management plane 230 and the context engine DP 250 in the data plane 210, with the control plane 220 not shown for purposes of clarity and focus only. In the example of FIG. 5, the context engine MP 240 communicates with context-based services MP 502 in the management plane 230. The context engine DP 250 communicates with context-based service plugins 504 (e.g., in a hypervisor 510 of the data plane 210. For example, just as the context engine 2110 can be instantiated in the management plane 230 as the context engine MP 240 and in the data plane 210 as the context engine DP 250, the context based service engine(s) 230 can be instantiated in the management plane 230 as context based services MP 502 and in the data plane 210 as context based service plugins 504.

In the example context-based services MP 502, a management plane analytics (MPA) message bus 506 facilitates communication with respect to services such as application visibility 508, IDFW 510, application firewall 512, process control 514, vulnerability scan 516, LB 518, etc. Each service 508-518 has a corresponding plugin 520-530 (e.g., application visibility 520, IDFW 522, application firewall 524, process control 526, vulnerability scan 528, LB 530, etc.) accessible from an MPA library 532 via the message bus 506.

In certain examples, the application visibility service 508 leverages the application visibility plugin 520 to gather process context per flow and store the context per flow information in the management plane 230. A user interface uses this information to visualize the flow between the VMs 114 and the processes running within the VMs 114, for example.

In certain examples, the IDFW service 510 works with the IDFW plugin 522 gathers the user context per connection flow and programs the DFW with this information to generate an identity-based firewall. In certain examples, the application firewall service 512 operates in conjunction with the application firewall plugin 524 to gather application/process context per connection flow and program the DFW with this information to generate an application-based firewall.

In certain examples, the process control service 514 leverages the process control plugin 526 to start, stop, pause, resume, terminate, etc., processes executing on the VM(s) 114 via the network based on the user and/or application context. In certain examples, the LB service 518 operates with the LB plugin 530 using the user and/or process context to load balance traffic based on policies.

Thus, using the plugin model, new context based services can be easily added. As shown in the example of FIG. 5, each context service has a MP component responsible for configuring the data plane 210 service component and gathering any information from the DP component to be stored in the management plane 230 and/or shown in the user interface (UI). The communication bus between the services 508-518 in the management plane 230 can leverage, MPA, remote procedure call (RPC), etc. The context engine DP 250 can cache realized context, for example.

As shown in FIG. 5, the context engine DP 250 includes a context engine core 534 operating with the context-based service plugins 504 and caching realized context in a realized context cache 536. The context engine core 534 operates in conjunction with an endpoint security (EPSec) library 538 and communicates with one or more VMs 114 via a multiplexor (mux) 540. Each VM 114 provides a guest context and contributes context via a thin agent 542-548 associated with each VM 114.

In certain examples, gathered context information can be cached in memory 536. Once the context is cached, a unique identifier (e.g., ID, such as a token, etc.) can be generated for each stored context and provided to each of the services 508-518 rather than passing the full context. Thus, context passing between the context services and data plane verticals such as DFW, LB, etc., can be optimized or otherwise improved. Also, the identifier (e.g., token, etc.) can be passed in one or more packets in a packet header (e.g., VxLAN/Geneve, etc.) to be used across hypervisors 510.

The policy engine 260 interacts with the context engine MP 240 in the management/policy plane 230, and the context engine DP 250 leverages plugins 504 and VM 114 guest content in the data plane 210. The policy engine 260 implements application entities in the management plane 230 based on context information extracted from the VMs 114 via the context engines 240, 250.

In certain examples, the context engine (and its components the context engine MP 240 and context engine DP 250) leverages information from guest introspection (GI) and context-based services 502, 504 to determine applications, users, and/or other processes operating in context on the system 100 and its VMs 114. For example, GI is a framework of elements including APIs for endpoint security to enable offloading of antivirus, anti-malware, and/or other processing to a dedicated agent at the hypervisor 510 level. Context information can be used by services 502, 504 to facilitate one or more user workflows for virtual machine, network, and/or application entity instantiation, modification, and control, for example.

In certain examples, the network virtualization manager provides services 502, 504 and an ability to create virtual networks such as an L2 network (e.g., for switching, etc.), an L3 network (e.g., for routing, etc.), etc. Among the services provided by the manager is an IDFW 510 and/or application firewall 512 service that allows a user to create rules to block traffic flowing from a certain source to a certain destination (e.g., specified according to IP address, user identity, application, etc.). The LB 518 provides a load balancing service based on which user is logged in, which application is responsible for message/data traffic or flow, etc.

In the hypervisor 510, for each flow of message/data, a context is collected by the context engine 240, 250. For example, when a user/application tries to connect to a server, data packets sent in that connection form the flow. When a user and/or application tries to connect to a server, the associated VM 114 can be added as a guest, and its flow can then be intercepted and monitored. An identity of the user and other "hidden" properties not otherwise available on the network can be determined (e.g., to which group the application belongs, what process(es) affect the connection, etc.). The context engine 240, 250 collects the flow information and provides it to service(s) 502, 504 and/or the policy engine 260, for example. For example, the firewall 510, 512 can use the collected flow context and uses rules, information, and context provided and allow or deny the connection, the flow, etc. In certain examples, context information can be visualized to an administrator and/or other operator (e.g., n applications are running in the data center, etc.).

Figure 6:
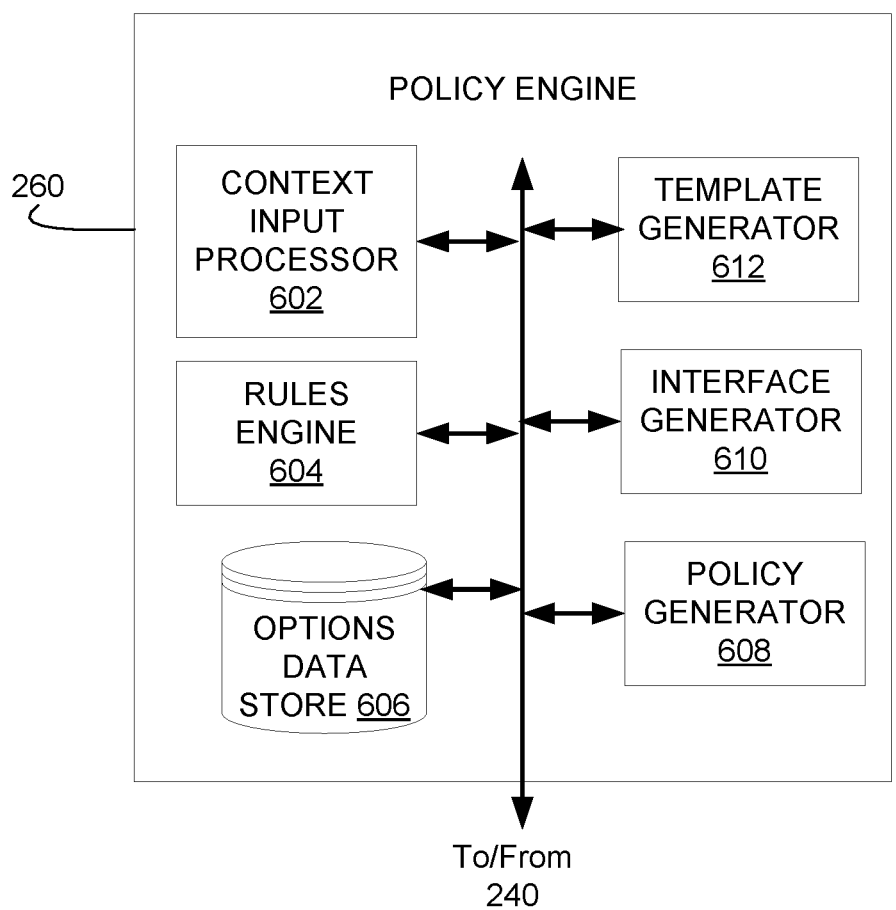
FIG. 6 illustrates an example implementation of a policy manager.

FIG. 6 illustrates an example implementation of the policy engine 260. The example policy engine 260 of FIG. 6 includes a context input processor 602, a rules engine 604, an options data store 606, and a policy generator 608. The context input processor 602 receives context input from the context engine MP 240 (e.g., application process identification, user ID, group information, associated VM 114, permission, etc.). The context input processor 602 processes the input context according to one or more rules provided by the rules engine 604.

By applying the rule(s) to the context information, one or more available policies can be retrieved from the options data store 606, such as by the policy generator 608. The policy generator 608 uses the processed context information and available option(s) to generate one or more policies associated with the context input. For example, one or more policies can be generated to instantiate and/or govern an application entity in the policy layer 235 corresponding to an application executing on a VM 114 monitored by the context engine MP 240. One or more policies can be generated to govern execution of that application on one or more VMs 114. One or more policies can be generated to govern instantiation of one or more VMs 114 and/or virtual networks to accommodate the application, the associated user/group of users, etc.

In certain examples, context information, policy(-ies), etc., can be visualized and output to a user. For example, the policy engine 260 can include an interface generator 610 to provide a visualization of policies, applications, users, connectivity, options, etc., for user review, modification, and/or other interaction. Via a resulting graphical user interface, for example, an administrator can create networks and services on top of application entities in the policy layer 235.

In certain examples, a configuration including application entity, network, service, etc., can be saved as a template via the template generator 612. Via the interface and/or apart from the interface, for example, a user and/or process can trigger the formation of a template based on context, settings, and other state information from a current configuration of the system 100, for example.

In certain examples, a modeling metalanguage (e.g., a markup language, etc.) can be used by the policy generator 608 to define a policy model including a policy data structure and associated meta information. Name, properties, metadata, relationship(s) (e.g., between a source object and a destination object, etc.), etc., can be defined in a policy tree structure, for example. Using policy models, relations can be configured and queried/addressed to provide information about the relationship between objects. Using relationships between policy models, access from policy to consumer and from consumer to policy can be facilitated. A policy tree can include user managed policy objects, realized state policy objects, etc. In some examples, some policy objects do not persist. In some examples, some policy objects do persist in the options data store 606. In certain examples, the policy engine 260 interacts with the network virtualization manager to connect, via a policy role, to the virtualization manager from the policy engine 260 and make API calls for debugging information, status information, connection information, etc. The policy model can define permitted whitelist communication, denied blacklist communication, other application permission, etc.

In certain examples, a group can be defined to include endpoints (VMs 114, IP addresses, VxLAN, etc.) that are logically connected and provide a specific service for a given application. Group members receive the same policy, for example. An application group represents a group of logically connected applications, for example.

A contract is a security policy that controls communication across application groups, for example. The contract includes a set of rules to allow or deny a service (e.g., a port, protocol, and/or classifier, etc.). Each group can provide and consume multiple contracts, for example. In certain examples, a consumer group and a provider group consume contracts. Each group can be associated with a tag. For a given pair of consumer and provider groups to communicate, their tags should match, for example. Provider and consumer tags are user configurable policy objects that identify source (e.g., provider) and destination (e.g., consumer) of a contract rule. In certain examples, if two different pairs of groups consume and provide the same contract, communication is allowed for pairs of groups with matching tags. In certain examples, tags are optional and applied if they are configured by a user.

Figure 7:
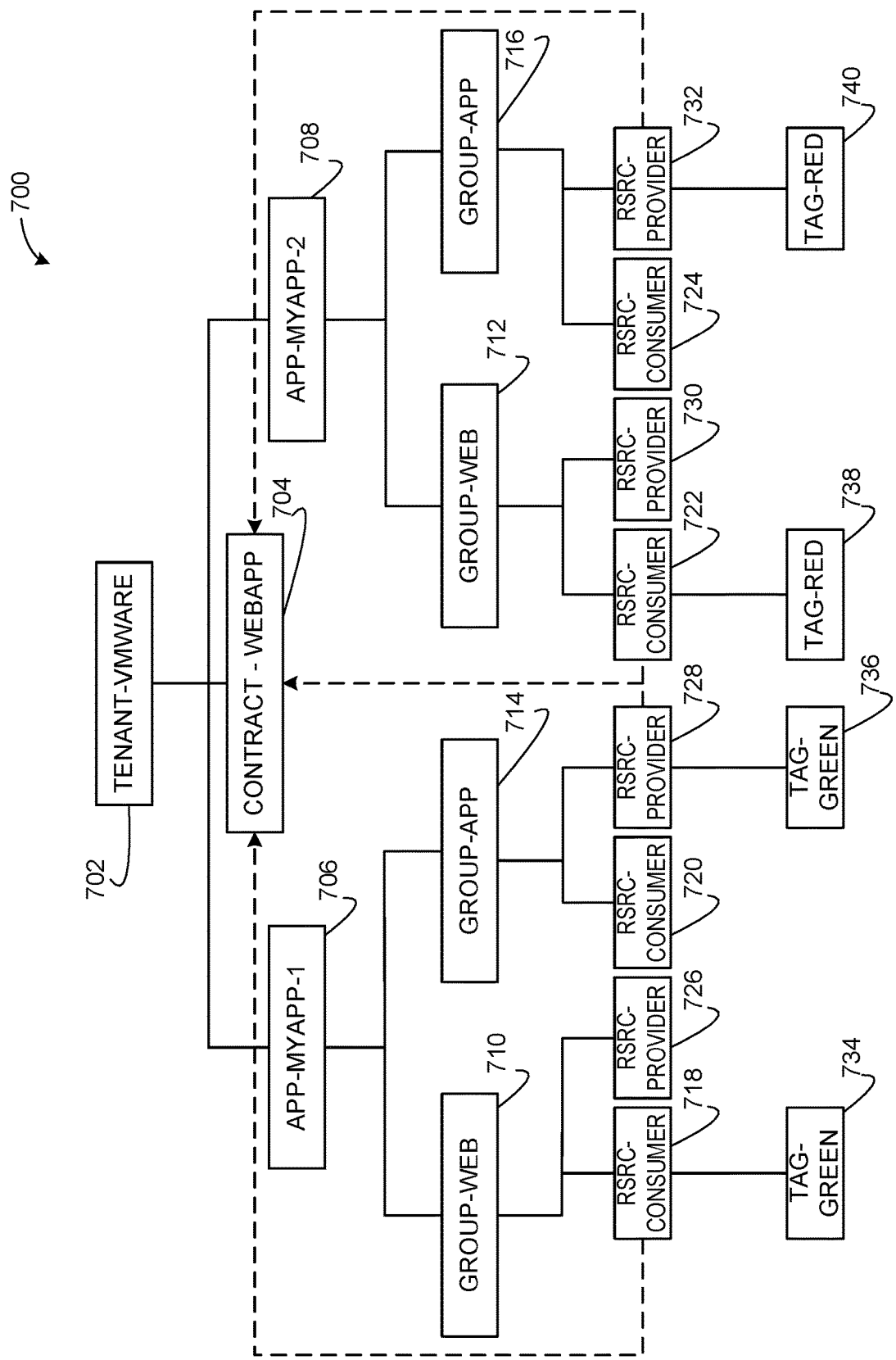
FIG. 7 illustrates an example of contracts with multiple consumers and providers.

FIG. 7 illustrates an example 700 of contracts with multiple consumers and providers. The policy layer 235 provides support for multiple tenants and an application-oriented view of a network management API. Tenants can be isolated, and policies configured in one tenant affect applications within that tenant instead of another tenant, for example. In the example of FIG. 7, a tenant 702 has a contract 704 and two applications 706, 708. Each application 706, 708 is associated with a Web group 710, 712 and an application group 714, 716. Each group 710-716 is associated with a consumer 718-724-provider 726-732 pair, and some such consumers and/or providers are tagged 734-740 according to the contract 704, for example.

Using the policy hierarchy of the example of FIG. 7, a given application 706, 708 can be controlled with policies associated with the application and its groups. Other policies not associated with the application 706, 708 should have no effect. Policies consumed by multiple applications 706, 708, however, can change behavior of all applications 706, 708 consuming that policy, for example. In certain examples, if policies conflict for a group 710-716 or endpoint 718-732, implicit rules and/or explicit rules can be used to determine which policy takes precedence (e.g., deny takes precedence over allow, etc.).

In certain examples, network virtualization endpoints managed by the policy engine 260 can receive policies from two different sources: infrastructure and user/tenant. Infrastructure policies are generic policies defined by an infrastructure administrator and can apply to any endpoint. Infrastructure policies can have higher priority compared to user/tenant level policies. Rather than an application-centric view, which may be conveyed through a user/tenant level policy, infrastructure policies may span across multiple applications(s)/tenant(s), for example.

Figure 8:
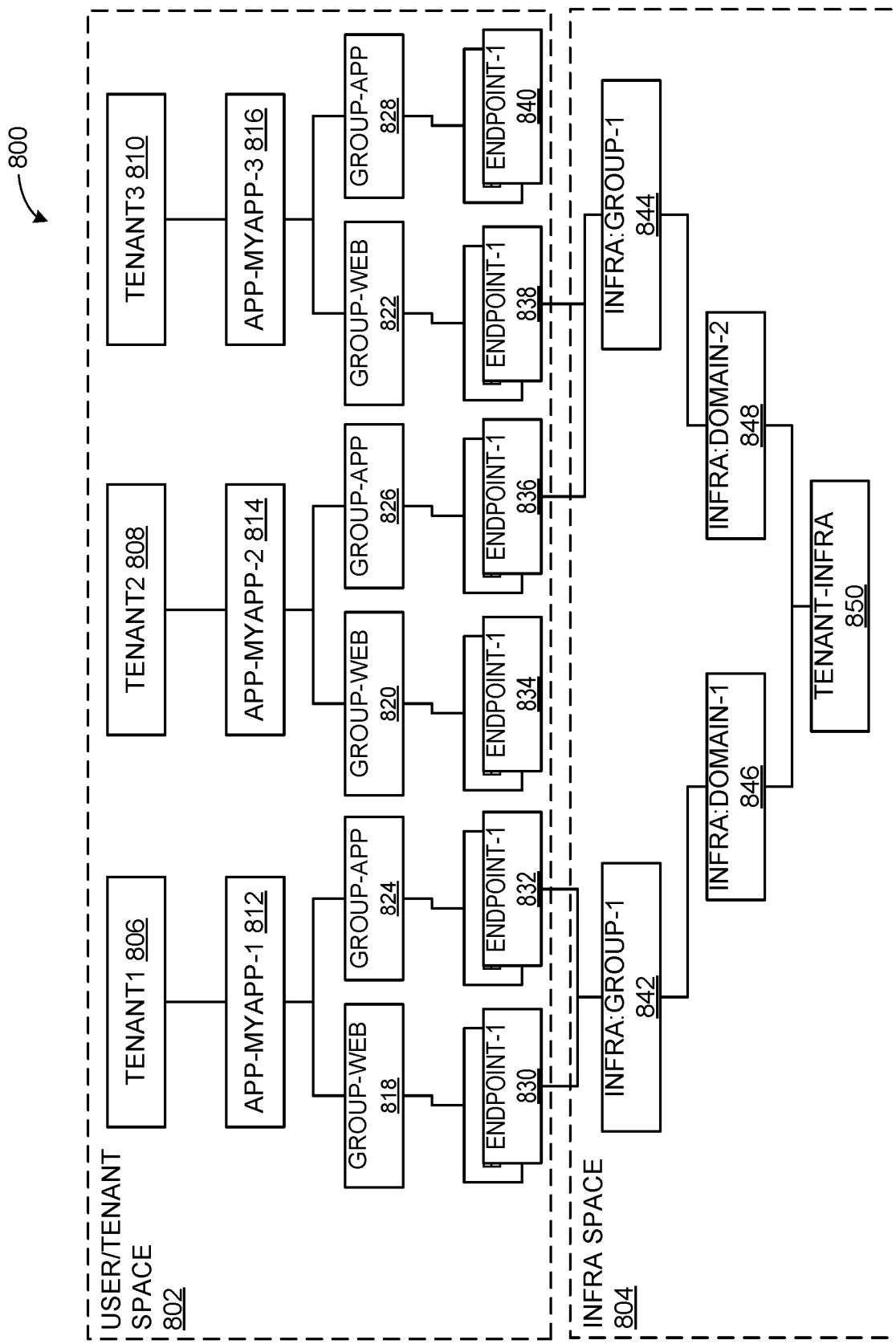
FIGS. 8-9 illustrate an example policy mapping between a user/tenant space and an infrastructure space.

FIG. 8 illustrates an example policy mapping 800 between a user/tenant space 802 and an infrastructure space 804. As shown in the example of FIG. 8, tenants 806-810 have corresponding applications 812-816, and each application has a web group 818-822 and an application group 824-828. Each group 818-828 has a plurality of endpoints 830-840 in the user/tenant space 802.

Figure 9:
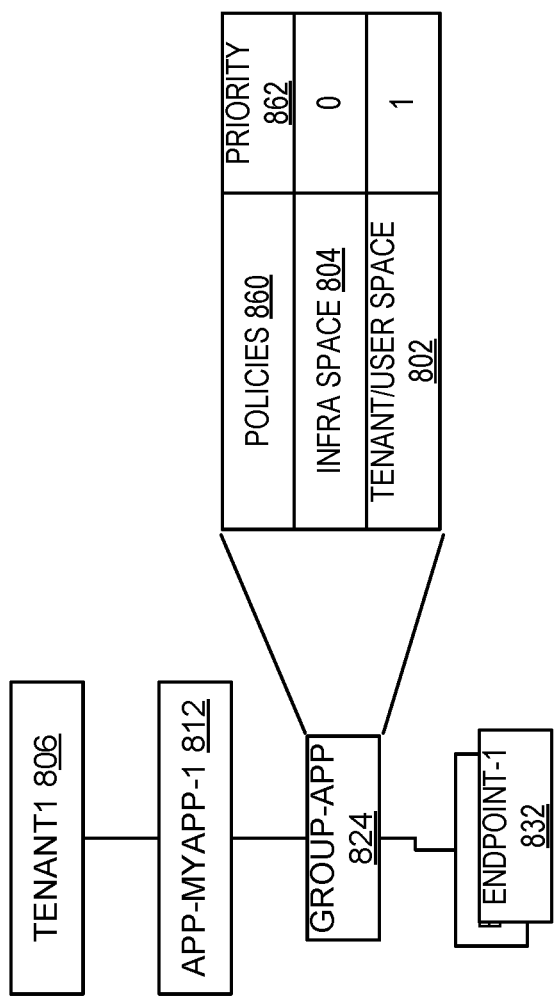

A subset of the endpoints 830, 832, 836, 838 is also connected to an infrastructure group 842, 844. Each group 842-844 is part of an infrastructure domain 846, 848, and the infrastructure domains 846-848 are associated with an infrastructure tenant 850, for example. As shown in the exploded view of FIG. 9, individual endpoints 830, 832, 836, 838 consume policies from the infrastructure space 804 as well as the user/tenant space 802. For example, the application group 824 consumes policies 860 with a priority 862 from the infrastructure space 804 and from the user/tenant space 802, which takes priority over policies 860 from the infrastructure space 804.

Figure 10:
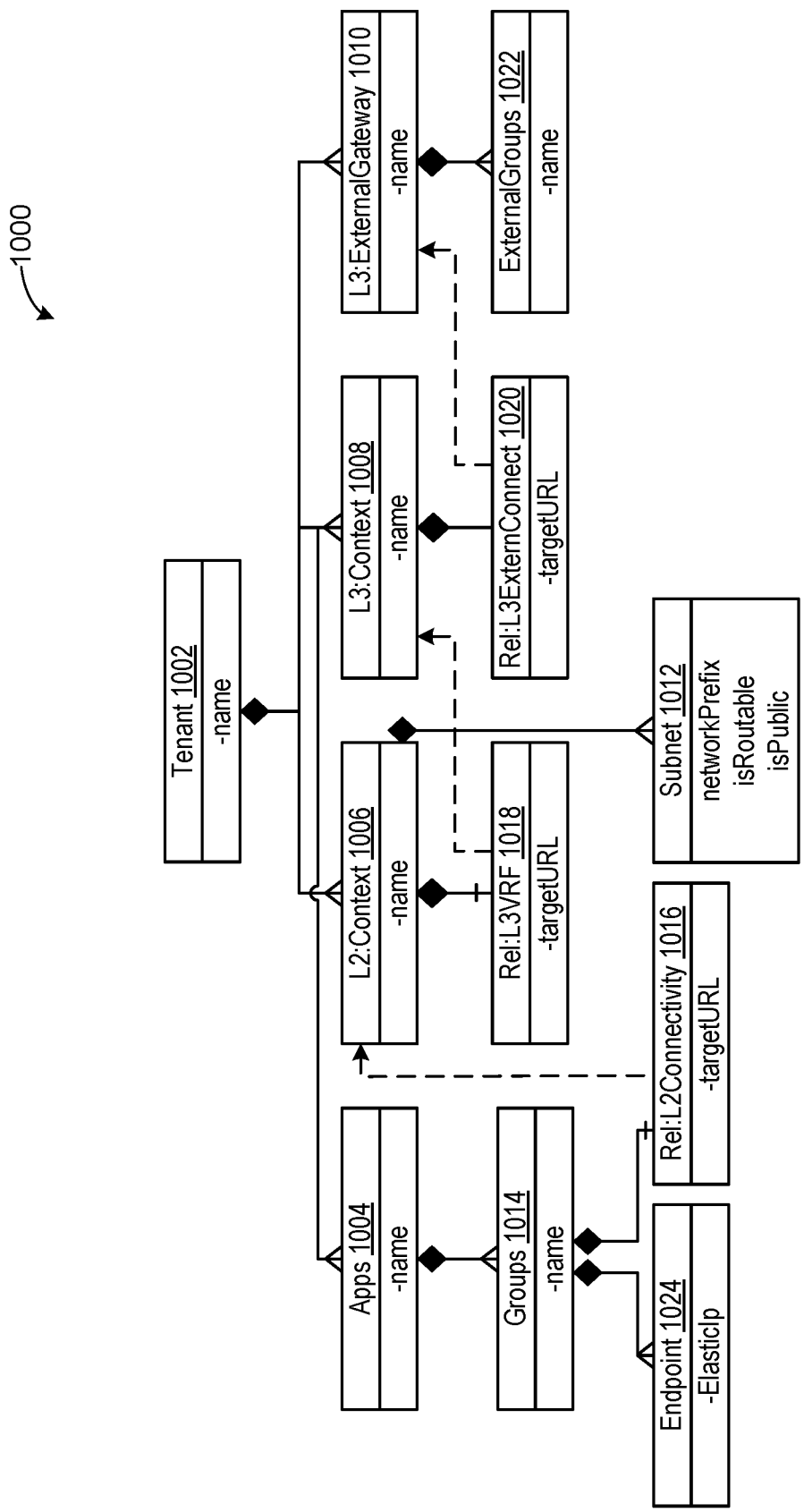
FIG. 10 illustrates an example network policy reflecting a network topology to be deployed for an application and to define external connectivity for the application.

FIG. 10 illustrates an example network policy 1000 reflecting a network topology to be deployed for an application and to define external connectivity for the application. In the example of FIG. 10, a tenant 1002 is associated with application(s) 1004, L2 context 1006, L3 context 1008, and L3 external gateway 1010. The L2 context 1006 is an abstraction to represent a broadcast domain. The context 1006 can be mapped to a virtual wire, logical switch or VLAN, etc. The broadcast domain belongs to a routing domain. The routing domain is represented as L3 context 1008. The context 1008 can be mapped to a TIER1 router and an edge, for example.

In certain examples, a subnet 1012 can be configured for L2 context 1006. The subnet 1012 may be an external subnet (e.g., reachable from an external gateway 1010 in an external group 1022) and/or local (e.g., reachable within its routing domain). Network connectivity between groups 1014 can be specified by defining L2 relationship connectivity 1016 between the groups 1014 and L2 context 1006. L2 context 1006 and L3 context 1008 is linked using a L3 linked relationship 1018.

External connectivity 1020 is expressed by connecting the L3 context 1008 to an external gateway 1010. The external gateway 1010 refers to pre-configured router(s) (equivalent edges in the virtual network) that provides external connectivity to applications 1004. In certain examples, policy is not managing external gateways 1010 and no services can be applied to them via policy.

In certain examples, an isolated network is achieved by creating L2 context 1006 and assigning a subnet 1012 to the L2 context 1006. L2 services, such as DHCP, metadata proxy, etc., can be used to support the isolated network. A routed network is achieved by creating L2 context 1006 and linking the L2 context 1006 to L3 the context 1008. Then, the network is reachable from all L2 contexts linked with L3 context. If a subnet assigned to routed network is routable from the external gateway 1010, then intent is expressed by marking the subnet 1012 as external and connecting the L3 context 1008 to the external gateway 1010. The subnet 1012 can be advertised to the external gateway 1010, for example.

As shown in the example of FIG. 10, an endpoint 1024 can be assigned a public/floating IP address to facilitate outgoing external connectivity (e.g., via SNAT rules, etc.). Port forwarding and/or translation can be facilitated at the endpoint 1024 (e.g., via dynamic NAT (DNAT) rules, etc.).

Figure 11:
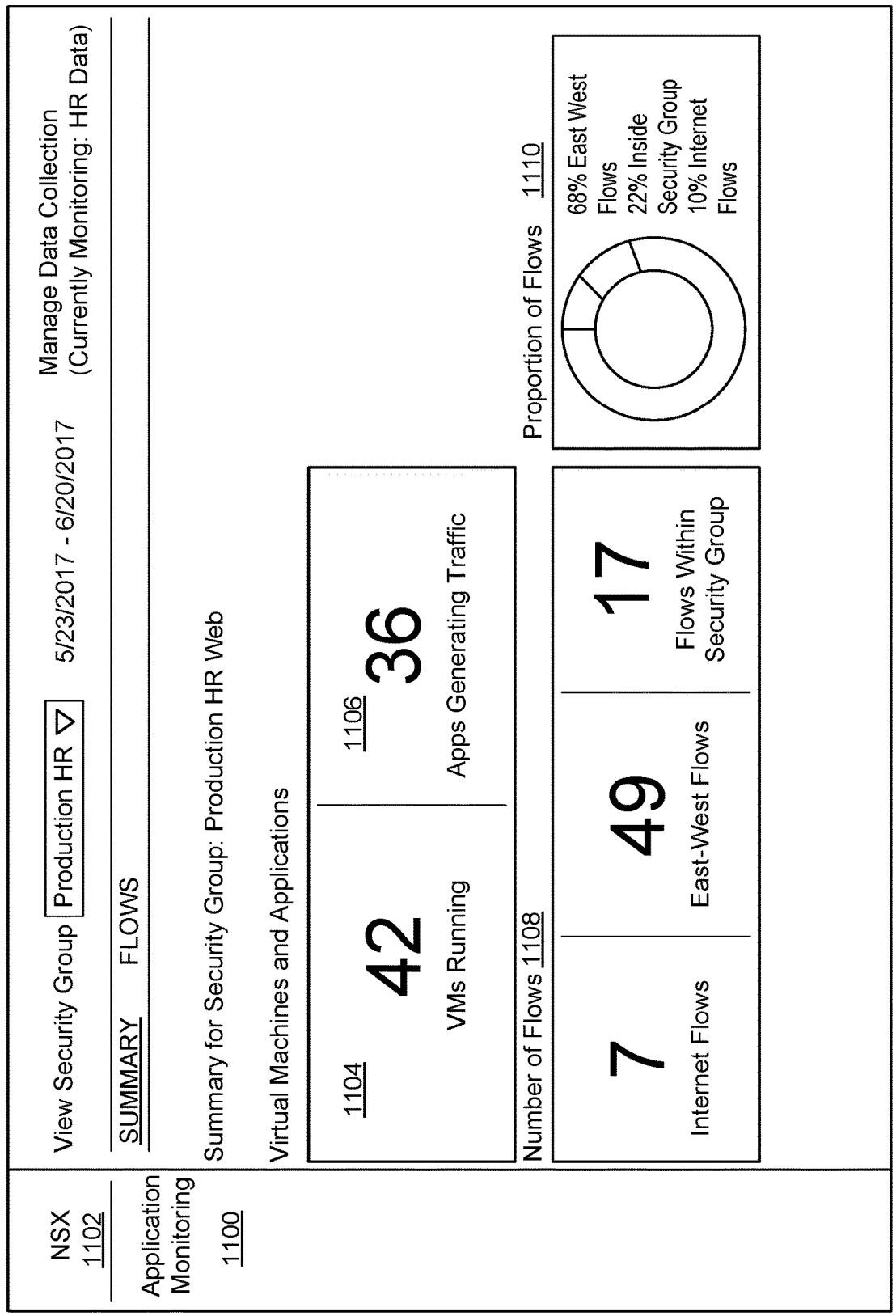

As described above, the interface generator 1010 can generate an interface for an administrator and/or other user to visualize configuration and operation information for a group being monitored. FIG. 11 illustrates an example application monitoring interface 1100 for a network virtualization manager 1102 summarizing VMs 114 running 1104, applications generating traffic 1106, a number of flows 1108, and a proportion of flows 1110. FIG. 12 shows an additional interface 1202 for the network virtualization manager 1102 to manage data collection for a group (e.g., a security group, etc.).

Figure 13:
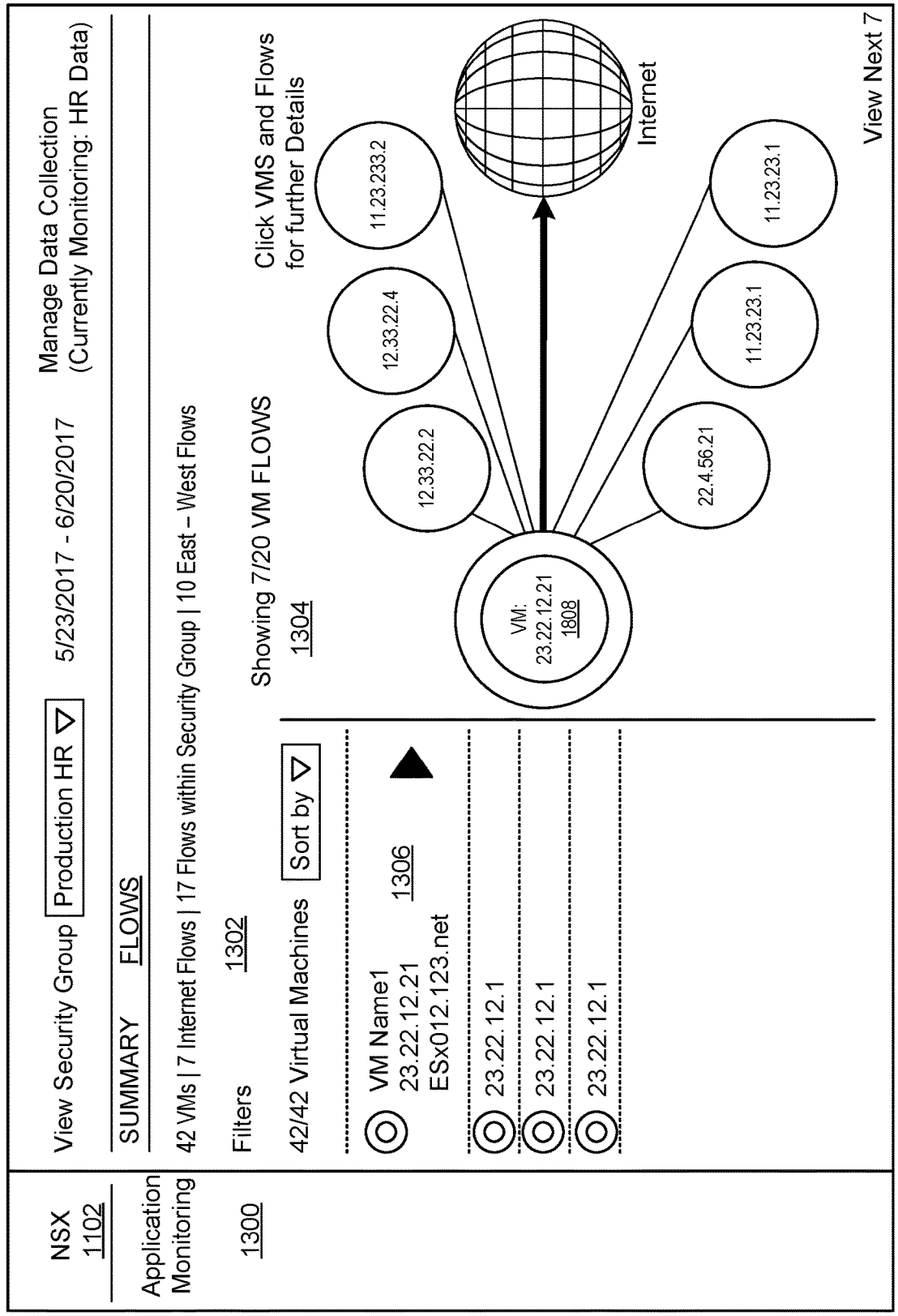

FIG. 13 shows an example interface 1300 providing flow information 1302 for the network virtualization manager 1102 including a listing of VMs 114 and a visualization of flows 1304. A VM entry 1306 can be selected from a list, for example, and a corresponding flow 1304 is then visualized. By selecting a VM representation 1308 shown in the flow 1304, additional detail regarding that flow 1304 and/or VM 114 operation can be revealed, for example.

Figure 15:
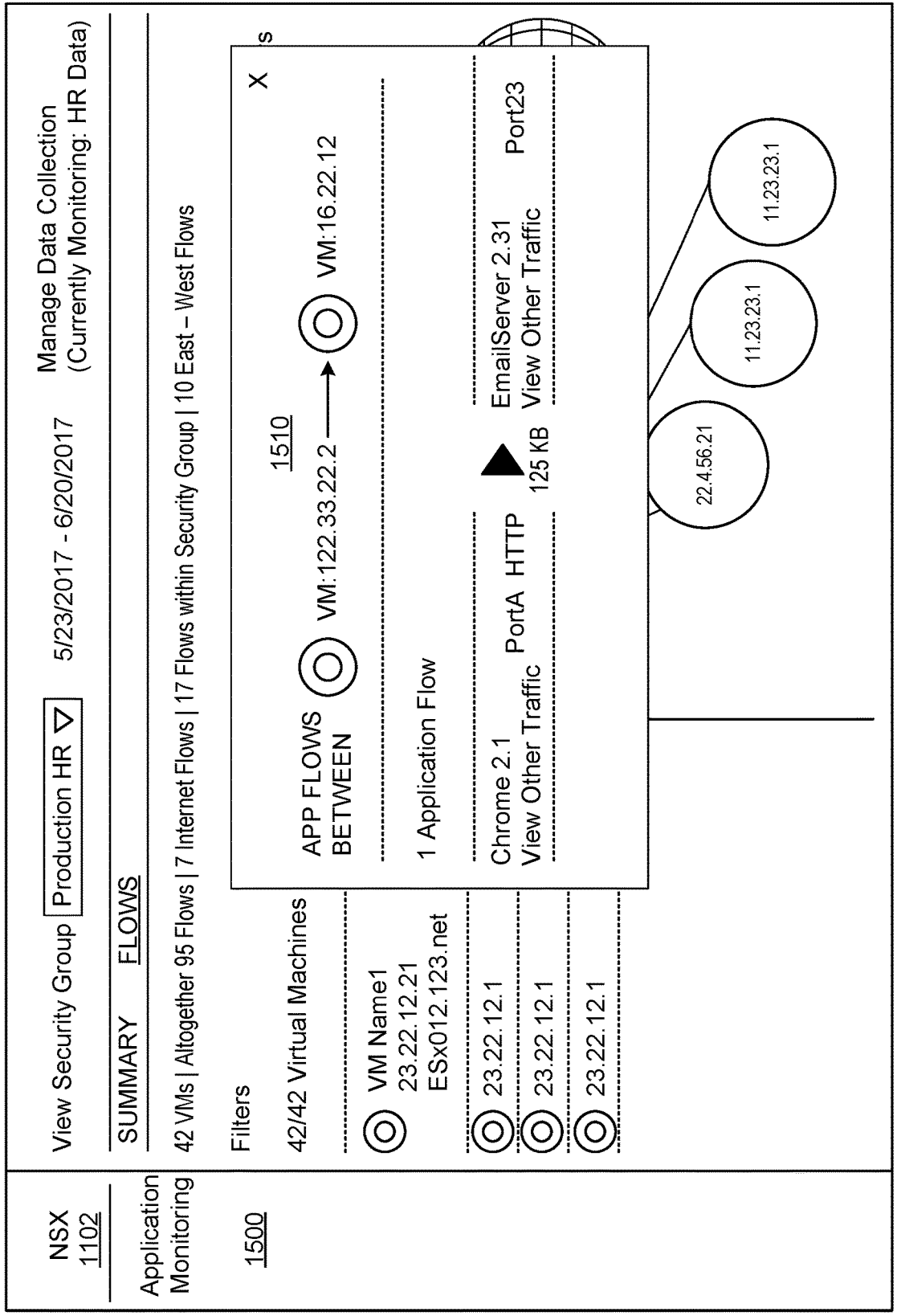
Figure 16:
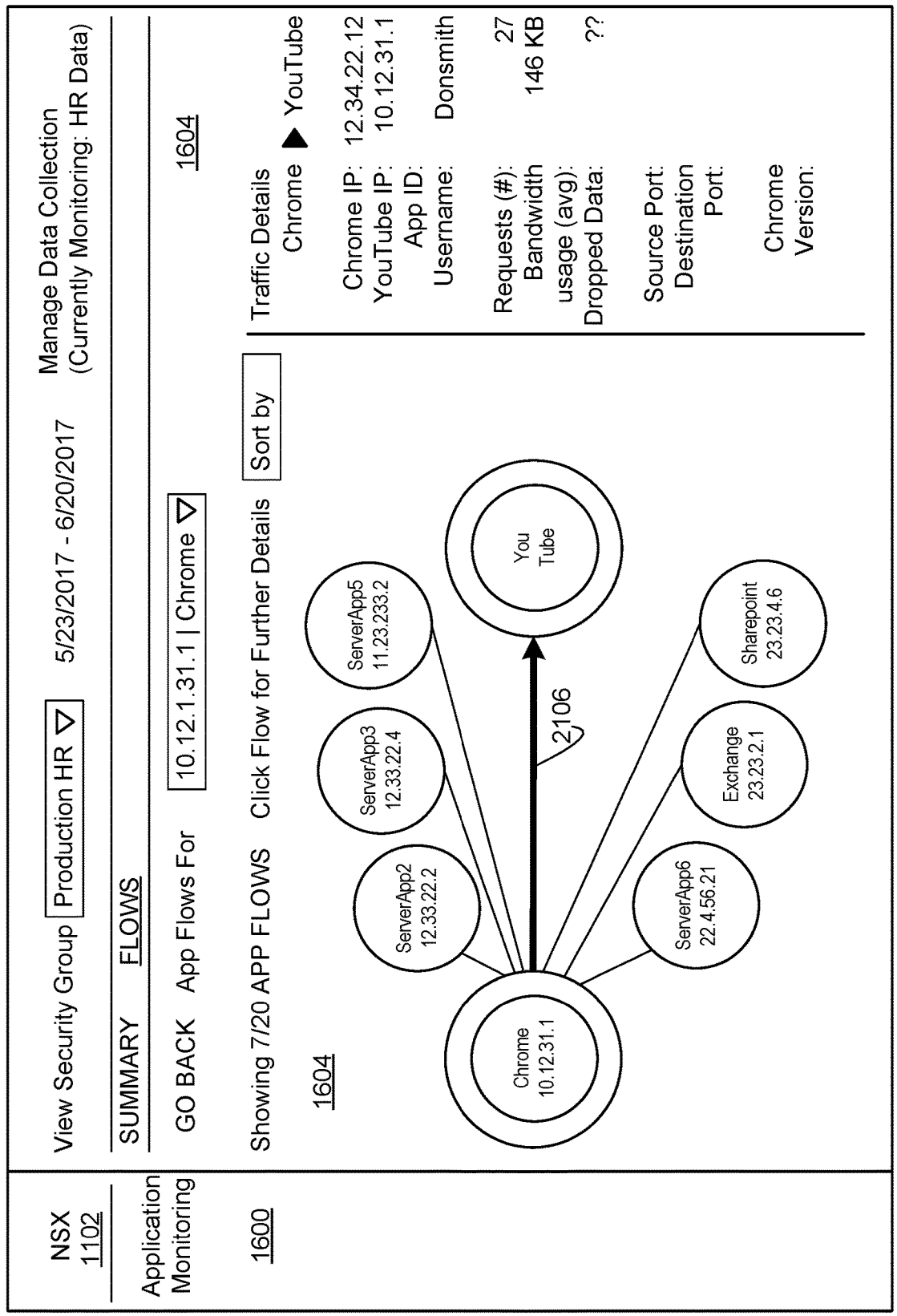

FIG. 14 shows an example interface 1400 including a pop-up box 1410 listing applications for the network virtualization manager 1102 running on a VM 114. As shown in the example interface 1410 of FIG. 14, an application name 1412, version 1414, user 1416, status 1418, etc., can be provided by the interface 1410. FIG. 15 shows another example interface 1500 including a pop-up box 1510 to visualize an example application flow between endpoints, including application, port, protocol, bandwidth, etc. FIG. 16 illustrates another example interface 1600 showing application flows 1602 and associated traffic details 1604 for a selected flow 1606.

Figure 17:
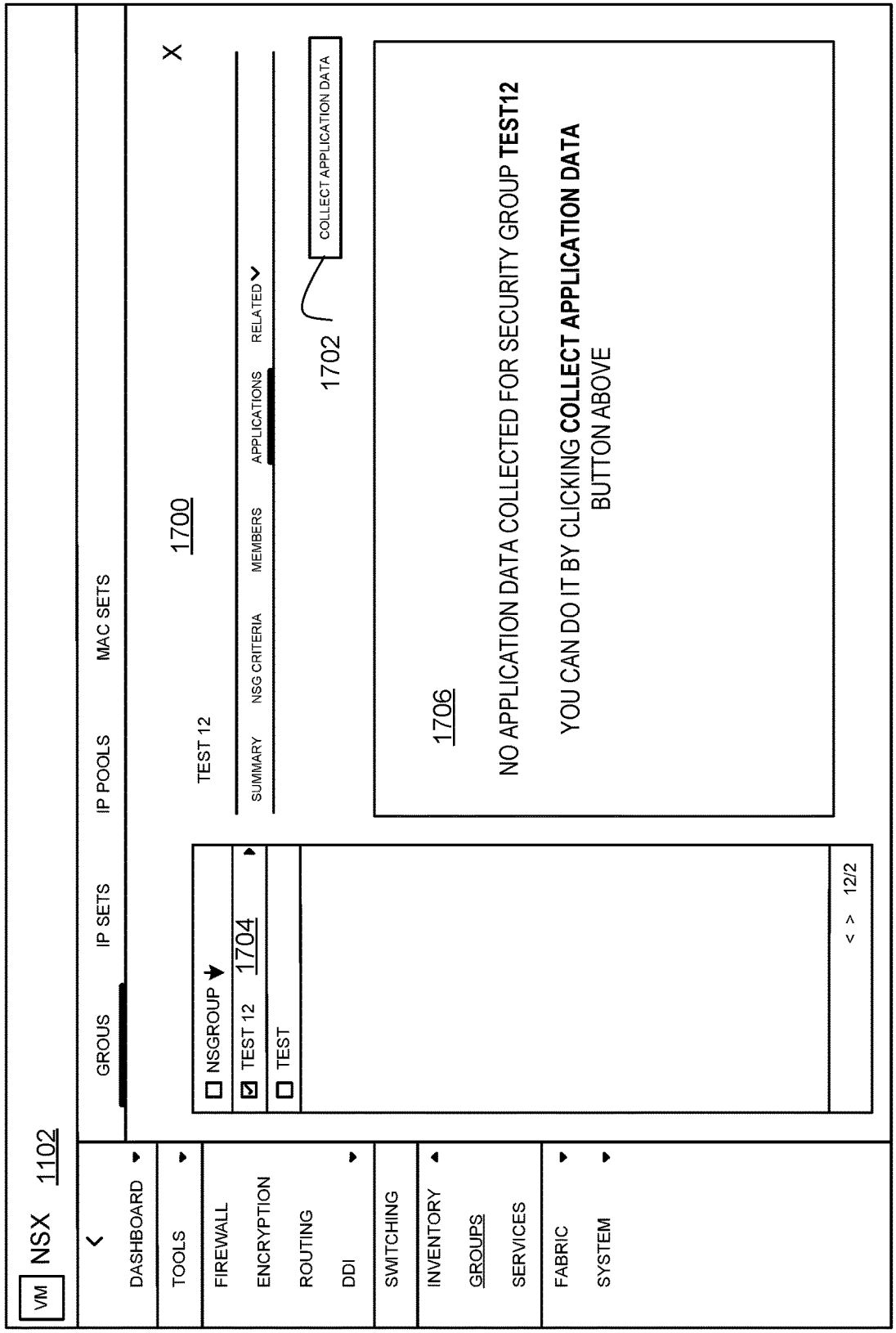
Figure 18:
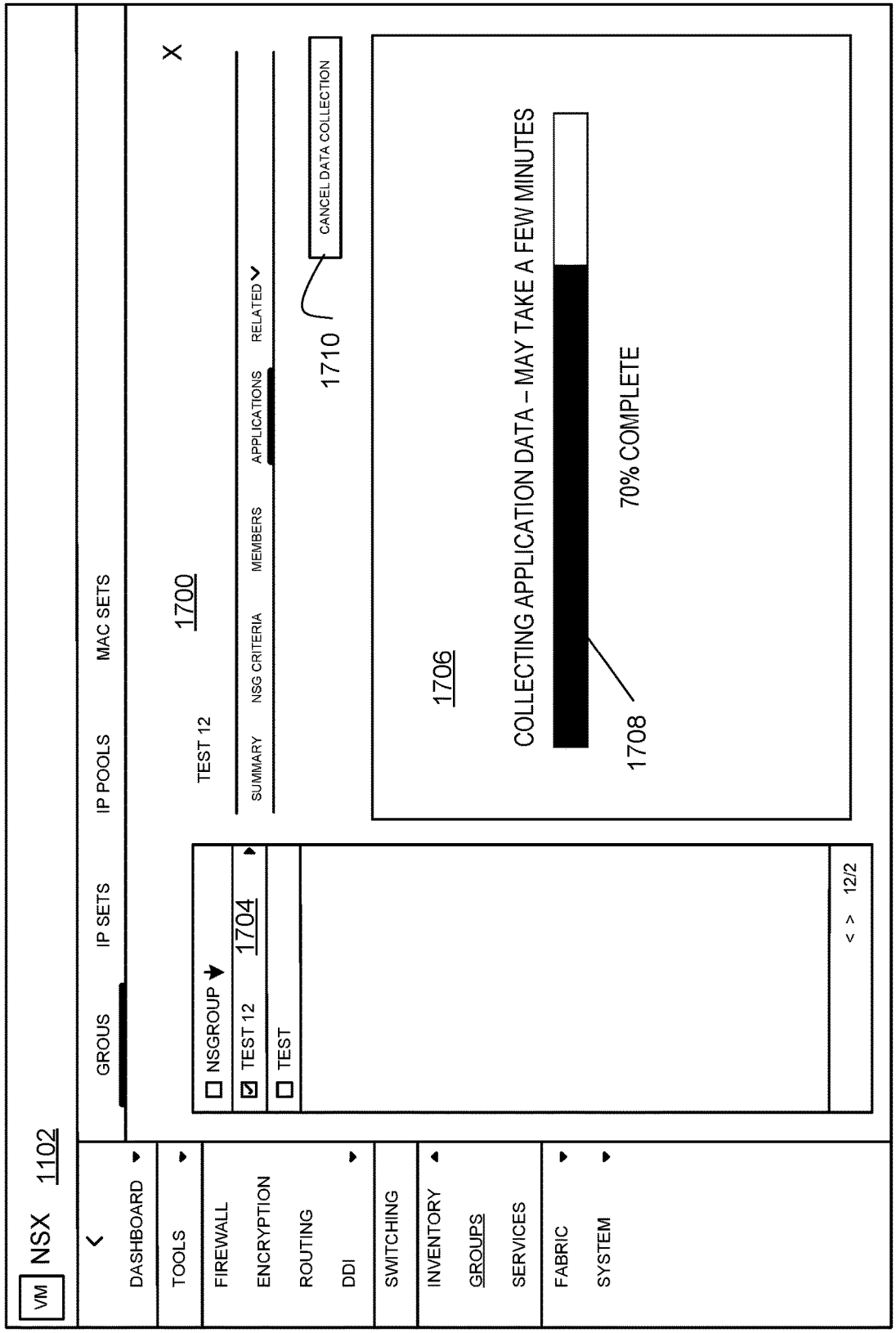

FIG. 17 illustrates an example interface 1700 for the network visualization manager 1102 including an option 1702 to collect application data for a selected security group 1704. Collected application data can be shown in the example window 1706. As shown in the example of FIG. 18, a percentage and/or other portion of completion 1708 can be shown in the window 1706 once application data collection has been initiated via the option 1702. During application data collection, the option 1702 becomes an option 1710 to cancel the application data collection.

Figure 19:
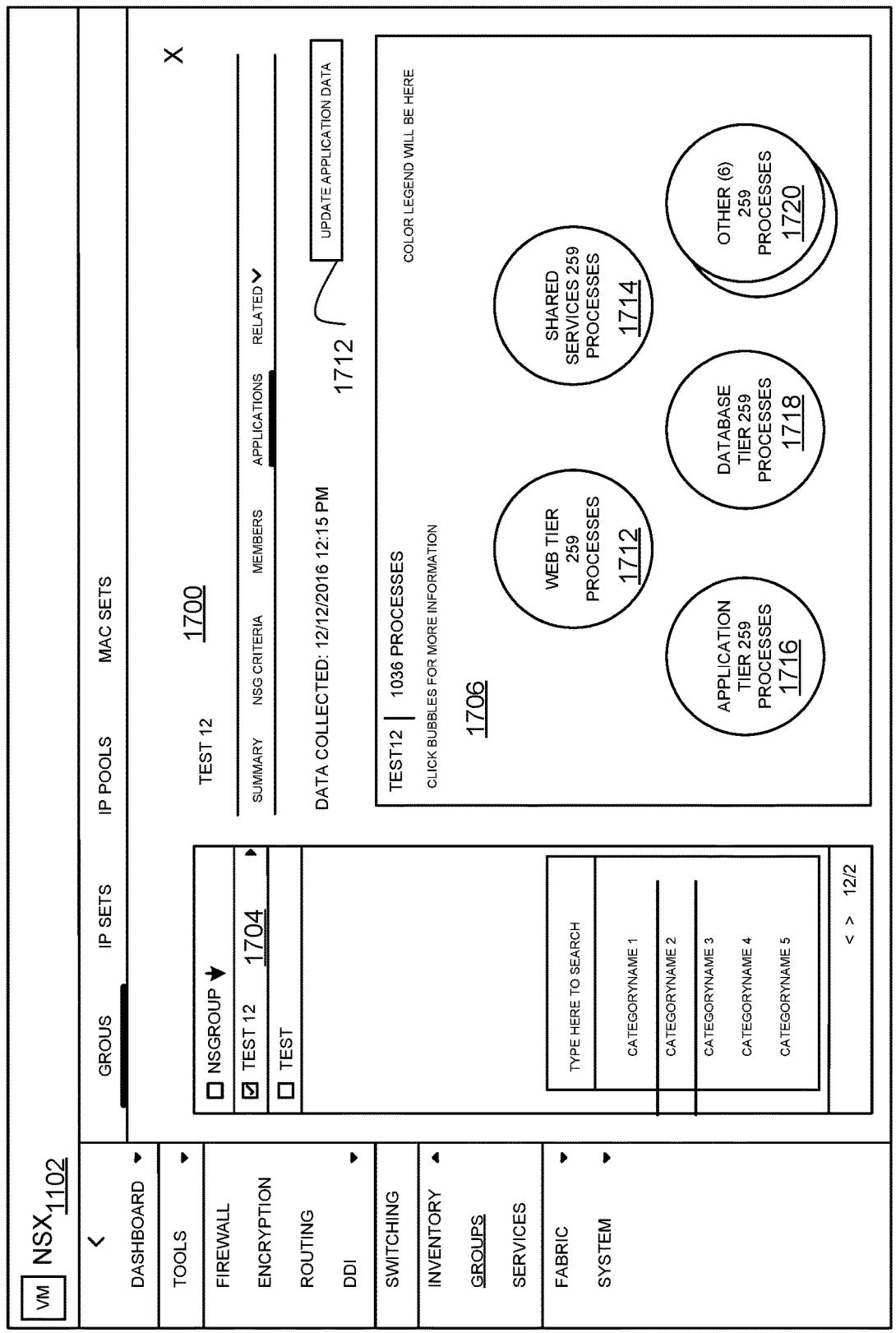

FIG. 19 shows a view of the example interface 1700 once application data collection has been completed. In the window 1706, identified processes are represented with icons 1712-1720. An icon 1712-1720 can be selected to view additional information regarding the associated process(es). For example, FIG. 20 illustrates an example interface 2000 providing further detail 2002 regarding the selected web tier process(es) 1712 from the example of FIG. 19. Each identified process 2004 can be selected and processed by the network virtualization manager 1102 and the policy engine 260 as an application entity 302, as described above.

Figure 21:
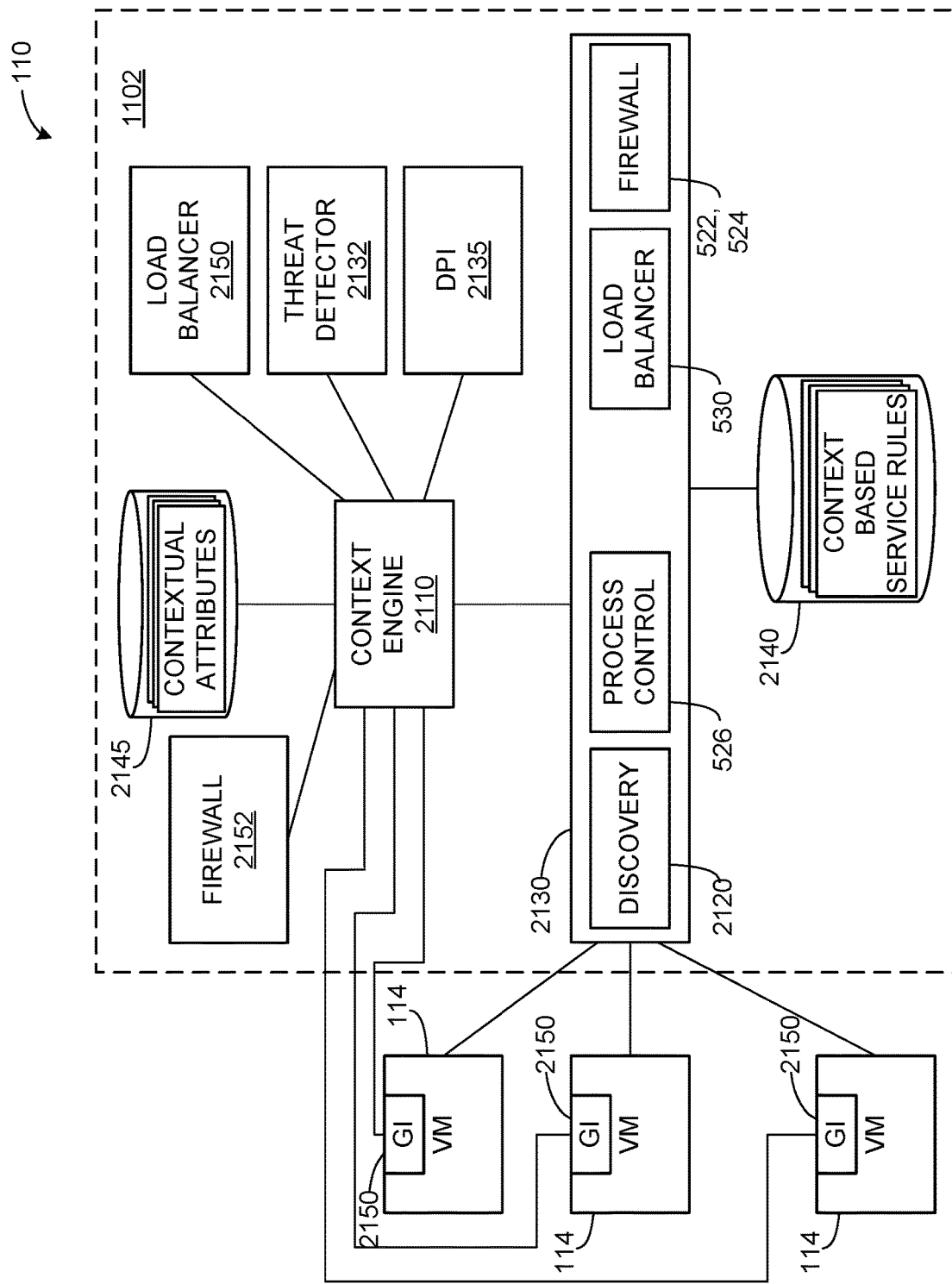
FIG. 21 illustrates an example implementation of the computing platform as a host computer/computing platform.

In certain examples, the network virtualization manager 1102 can be implemented with the VMs 114 via the computing platform provider 110. FIG. 21 illustrates an example implementation of the computing platform provider 110 as a host computer/computing platform 110. As shown in the example of FIG. 21, the host computer 110 includes a plurality of data compute nodes (DCNs) or VMs 114 in communication with a network virtualization manager 1102. The example network virtualization manager 1102 includes a context engine 2110 (e.g., a composite representation of the context engine MP 240 and the context engine DP 250) and one or more context-based service engine(s) 230 including, for example, a discovery engine 2120, the process control engine 526, the load balancer 530, the firewall engine 522 and/or 524, a threat detector 2132, and a deep packet inspection (DPI) module 2135. The host computer 110 also includes attribute-based, service-rule storages 2140 and an attribute storage 2145 associated with the network virtualization manager 1102.

The DCNs/VMs 114 are endpoint machines executing on the host computer 110. The DCNs can be implemented as VMs 114, containers 114a, and/or a mix of VMs 114 and containers 114a, for example. For ease of reference, the DCNs 114 are referred to herein as VMs 114. However, it is clear from the description that the VMs 114 forming the DCNs in the present disclosure can alternative, or in addition, include containers 114a.

Each VM 114 includes a guest-introspection (GI) agent 2150, which executes to collect contextual attributes for the context engine 2110. In some examples, the context engine 2110 collects contextual attributes from the GI agents 2150 of the VMs 114 on its host through a variety of different ways. For example, the GI agent 2150 on a VM 114 registers hooks (e.g., callbacks) with one or more modules (e.g., kernel-space modules or userspace modules) in the VM's operating system for network connection events and new process events.

Upon occurrence of a new network connection event, the GI agent 2150 receives a callback from an operating system (OS) of the corresponding VM 114 and, based on this callback, provides a network event identifier to the context engine 2110. The network event identifier provides a set of attributes pertaining to the network event. For example, the network event attributes can include a five-tuple identifier (e.g., source port and IP address, destination port and IP address, and protocol) of the requested network connection, process identifier of the process requesting the network connection, a user identifier associated with the requesting process, and a group identifier (e.g., an activity directory (AD) identifier) associated with the requesting process.

In some examples, the context engine 2110 directs the GI agent 2150 to collect from the OS additional process parameters that are associated with the process identifier (ID) that was received with the network event. These additional process parameters include process name, process hash, process path with command line parameters, process network connection, process-loaded modules, and one or more process consumption parameters specifying consumption of one or more resources of the machine (e.g., central processing unit consumption, network consumption, and memory consumption, etc.) by the process, for example. In certain examples, rather than using the process identifier to query the GI agent 2150 for additional process parameters associated with a network event, the context engine 2110 receives process parameters associated with a network event when the GI agent 2150 reports the network event to the context engine 2110.

In some examples, the OS of the VM 114 delays transmission of a new network event (e.g., does not start sending data messages for the network event) until the GI agent 2150 directs the OS to proceed with processing of the network event. In some such examples, the GI agent 2150 allows the OS to proceed with processing the network event after the context engine 2110 has collected attributes for this event (e.g., after receiving a message from the context engine 2110 acknowledging that the process and/or network attributes for the new network event have been received, etc.).

In some examples, the context engine 2110 uses a process hash received from the GI agent 2150 to identify the name and version of an application (e.g., the software product) to which the process belongs. For example, the context engine 2110 can store process hashes and associated application names/versions to compare the process hash received from the GI agent 2150 with the stored process hashes to identify a matching hash. The context engine 2110 then uses the application name/version of the matching hash as the application name and version of the process associated with the event, for example.

In some examples, the context engine 2110 obtains the process hashes and application names/versions from one or more network or compute managers, which may operate on another device or computer. In other examples, the context engine 2110 provides the hash associated with a process identifier to a network or computer manager, which then matches this hash to its process hash records and provides the application name/version of the associated process to the context engine 2110. Once the context engine 2110 obtains the application name/version associated with a network event, the context engine 2110 can provide the name and version attributes to the attribute/context-based service engine 2130, which can use this information (e.g., the application name and/or version) to identify a service rule to enforce.

In some examples, upon occurrence of a process event on a VM 114, the VM's GI agent 2150 receives a callback from the VM's OS and, based on this callback, provides a process event identifier to the context engine 2110. The process event identifier provides a set of attributes pertaining to the process event. The set of attributes includes the process identifier, for example. In some examples, the set of attributes also includes a user identifier and a group identifier (e.g., an activity directory (AD) identifier).

In some examples, the GI agent 2150 provides process parameters (e.g., process identifier, user ID, group ID, process name, process hash, loaded module identifiers, consumption parameters, etc.) associated with a process event to the context engine 2110 when the GI agent 2150 reports the process event to the context engine 2110. In other examples, the context engine 2110 directs the GI agent 2150 to collect from the OS additional process parameters that are associated with the process identifier that the context engine 2110 received with the process event. These additional process parameters can be the same as or similar to (e.g., process name, process hash, loaded module identifiers, consumption parameters, etc.) the process parameters described above for reported network events, for example.

In some examples, the context engine 2110 augments the contextual attributes that it receives from the GI agents 2150 with contextual attributes that it receives from other modules that execute on the host. The DPI module 2135 (also referred to as the deep packet inspector) and the threat detector 2132 (also referred to as the threat inspection module) are two such modules that provide context attributes to augment those that the context engine 2110 collects from the GI agent 2150. In some examples, the DPI module 2135 is directed by the context engine 2110 or another module (e.g., the firewall engine 522 and/or 524) to examine data messages of a data message flow associated with a process ID to identify a type of traffic being sent in these data messages by the application associated with the process ID. The type of traffic can be identified by an AppID, for example, and the DPI module 2135 can analyze a data message flow to generate the AppID for the data message flow, for example.

As shown the example of FIG. 21, load balancer service 530 communicates with the load balancer 2150, and the firewall 522, 524 service(s) communicate with the firewall 2152. Thus, the plugins 522, 524, 530 talk with corresponding system components 2150, 2152 via the context engine 2110.

In some examples, the context engine 2110 combines the AppID for a network event with other context attributes that the engine 2110 identifies for the network event to produce a rich set of attributes that the service engine(s) 2130 can then use to perform their services (e.g., discovery 2120, process control 526, load balancing 530, firewall 522 and/or 524, etc.). The rich set of attributes provides application identity (e.g., application name, application version, application traffic type, etc.), based on which the service engine(s) 2130 can perform their services. In some examples, the context engine 2110 uses a network event's five-tuple identifier to associate the AppID for this events data message flow with the contextual attributes that the context engine collects from the GI agent 2150 of the VM 114 associated with the data message flow (e.g., of the VM 114 from which the data message flow emanates, etc.).

The threat detector 2132 provides a threat level indicator that specifies a threat level (e.g., risk of malware, spyware, virus, intrusion, error, etc.) associated with a particular application that is executing on the VM 114. Once the context engine 2110 obtains a set of process parameters that specify an application/process that has started on the host computer 110 (e.g., on its VM 114 or container 114a) or that is sending data messages on the computer 110, the context engine 2110 can provide one or more process parameters (e.g., process hash, application name, application version, AppID, other process parameters, etc.) to the threat detection module 2132, for example.

The threat detection module 2132 then generates a threat level indicator (e.g., low, medium, high, etc.) for the identified process and provides this threat level indicator to the context engine 2110. In some examples, the threat detector 2132 assigns a threat score to an application running on the VM 114 based on various application behavioral factors, such as (1) quality of input validation, (2) use of encrypted or unencrypted network links to pass authentication credentials, (3) strength of password and account policies, (4) storage of configuration secrets in clear text, (5) file transfer, (6) known malware tendencies of the application, (7) evasiveness of the application, (8) known application vulnerabilities, etc. In some examples, the threat detector 2132 is a third-party whitelisting application, such as Bit9, etc.

In some examples, the context engine 2110 provides the threat level indicator produced by the threat detector 2132 to one or more service engines 2130 as another contextual attribute for performing services on a new process event or the data messages of a new network event. The service engine 2130 can use the threat level indicator as another attribute to identify service rules to enforce.

The context engine 2110 stores the contextual attributes that it collects for network events and process events in attribute storage 2145. In some examples, the context engine 2110 stores each set of contextual attributes with one or more network event identifiers and/or process identifiers. For example, the context engine 2110 stores the collected contextual attributes for a new process event with the process identifier, or with a reference to this identifier. The context engine 2110 then uses the process identifier to provide the collected context attributes to a service engine 2130 (e.g., the process control engine 526) that performs a service for the process event.

In some examples, the context engine 2110 stores the collected context attributes for a new network connection event with the five-tuple identifier of the network connection event and/or with a reference to this five-tuple identifier. In some such examples, the context engine 2110 provides to a service engine 2130 the context attributes for a network event along with the event's five-tuple identifier. The data messages for the network event include the five-tuple identifier, and the service engine 2130 can use the supplied five-tuple identifier to identify the context attributes associated with a data message flow.

In certain examples, the context engine 2110 employs a push model to distribute the collected contextual attributes to the service engine(s) 2130. In other examples, the context engine 2110 employs a pull model to distribute the contextual attributes to the service engine(s) 2130. In some examples, the context engine 2110 uses a pull model with some service engine(s) 2130 and a push model with other service engine(s) 2130. The contextual attributes for a process or network event can be with the process and/or network event flow identifier (e.g., the flow's five-tuple identifier), for example.

In some examples, the context engine 2110 distributes to the service engine 2130 only the contextual attributes that are relevant for that service engine's service rules. For example, the context engine 2110 compares each collected attribute in a set of collected attributes (e.g., for a network event or a process event) with a list of attributes used by a service engine's service rules, and discards each collected attribute that is not used by the service rules.

The context engine 2110 then provides to the service engine 2130 only the subset of collected attributes (e.g., in the set of collected attributes) that is being used by the engine's service rules. In other examples, the service engine(s) 2130 perform a filtering operation to discard the contextual attribute(s) that are not used.

In the pull model, the context engine 2110 receives queries from the service engine 2130 for the contextual attributes that the context engine 2110 has collected for a particular process or network connection. In some examples, the context engine 2110 receives a process ID and/or a flow identifier (e.g., five-tuple identifier) with a query from the service engine 2130, and uses the received identifier to identify the attribute set that the context engine 2110 is to provide to the service engine 2130.

In some examples, the context engine 2110 generates a service token (also called a service tag) for the collection of attributes that are relevant for the service engine 2130 and provides the service token to another module (e.g., the GI agent 2150 and/or another module on the host computer 110) to convey to the service engine 2130 (e.g., pass along in a data message's encapsulating tunnel header, etc.). The service engine 2130 then extracts the service token and provides this service token to the context engine 2110 to identify the contextual attributes that the context engine 2110 is to provide to the service engine 2130, for example.

Figure 22:
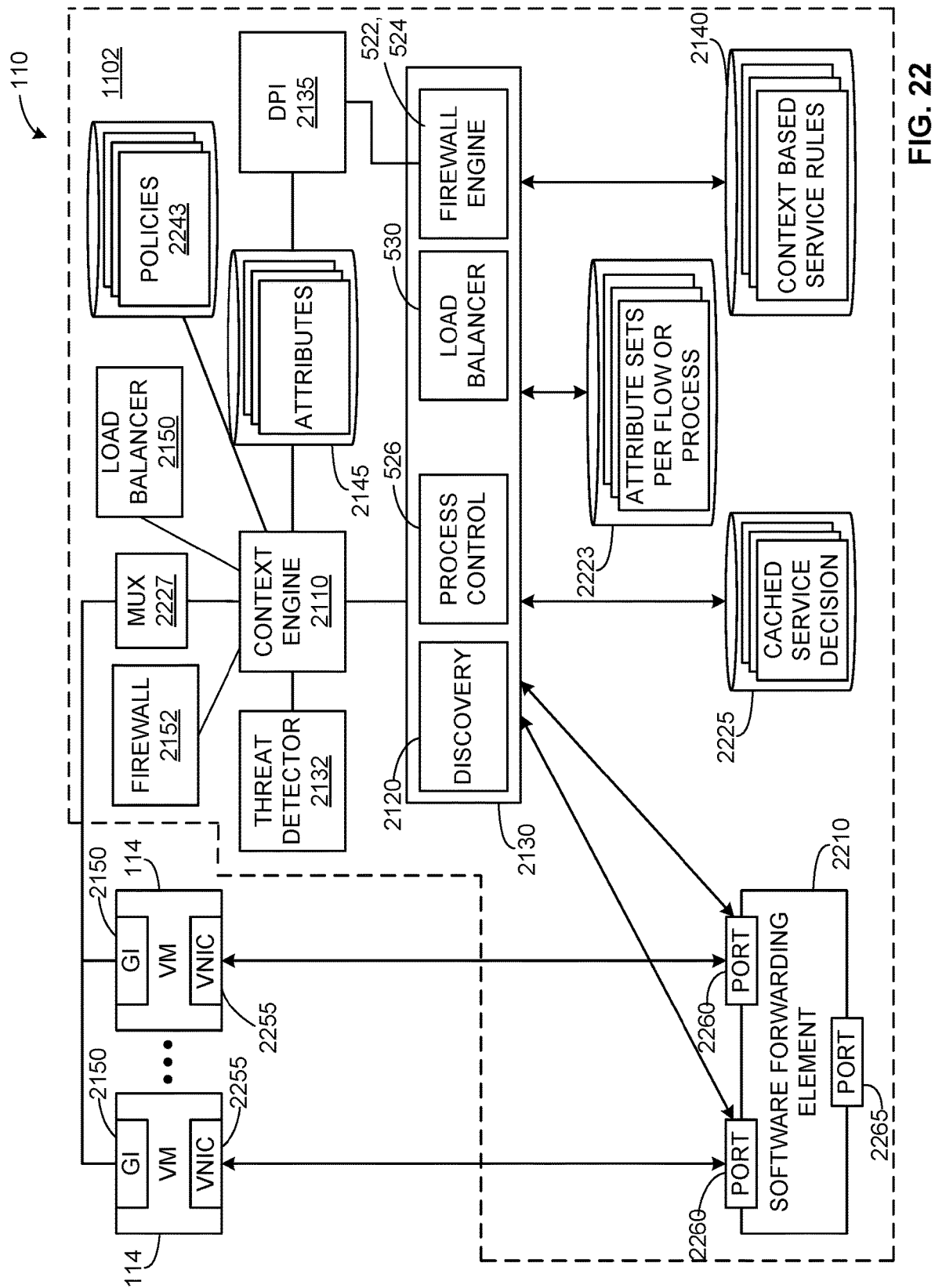
FIG. 22 illustrates a more-detailed example of a host computer that can be used to establish a distributed architecture to configure and perform context-rich, attribute-based services in a datacenter.

In some examples, the context engine 2110 and the service engine(s) 2130 are kernel space components of a hypervisor (e.g., on which multiple VMs 114 and/or containers 114a execute, as further described below by reference to FIG. 22, etc.). In other examples, the context engine 2110 and/or one or more service engines 2130 are user space processes. For example, one or more service engines 2130 are service VMs (SVMs) 114. In some examples, one or more service engines 2130 are in ingress datapaths and/or egress datapaths of VMs 114 to receive access to data message flows to and from the VMs 114 to perform services on these data message flow(s). In other examples, one or more other modules on the host 110 intercept data messages from the ingress/egress datapaths and forward these messages to one or more service engines 2130 for the engine(s) 2130 to perform services on the data messages. FIG. 22 illustrates and describes one such example implementation.

Different implementations include different types of context-based service engine(s) 2130. In the example illustrated in FIG. 21, the service engines 2130 include the discovery engine 2120, the process control engine 526, the load balancer 530 and the firewall engine 522, 524. Each of these service engines 2130 has an attribute-based, service-rule storage. FIG. 21 collectively represents the context-based, service-rule storages of these service engines 2130 with the context-based, service rule storage 2140 to simplify the illustration presented in FIG. 21.

In some examples, each service rule in the service-rule storage 2140 has a rule identifier to be matched to a process or flow identifier to identify the rule to be enforced for a process or network event. In some examples, the service rule data storage 2140 is defined in a hierarchical manner to help ensure that a rule check matches a higher priority rule before matching a lower priority rule. Also, in some examples, the service rule data storage 2140 includes a default rule that specifies a default action for any rule check, as further explained below.

In certain examples, the firewall engine 522 and/or 524 performs firewall operations on data messages sent by or received for the VMs 114. The firewall operations are based on firewall rules in the rule storage 2140. Some of the firewall rules are defined based on layer 2-layer 4 attributes (e.g., in terms of five-tuple identifiers. Other firewall rules are defined in terms of contextual attributes that can include one or more of the collected contextual attributes, such as application names, application versions, AppID, resource consumption, threat level, user ID, group ID, etc. In some examples, other firewall rules are defined in terms of both L2-L4 parameters and contextual attributes. In such examples, since the firewall engine 522, 524 can resolve firewall rules that are defined with reference to contextual attributes, this firewall engine 522, 524 can be referred to as a context-based firewall engine 522, 524.

In some examples, the context-based firewall engine 522, 524 can allow, block, and/or re-route data message flows based on one or more contextual attributes by identifying firewall rules based on a combination of the collected contextual attributes. For example, the firewall engine 522, 524 can block all email traffic from chrome.exe when the user is part of a Nurse user group and the firewall rules specify: (1) data messages should be blocked when the flow is associated with the Nurse group ID, (2) the AppID identifies the traffic type as email, and (3) the application name is Chrome. Similarly, context based firewall rules can block data message flows associated with video conferences, online video viewing, or use of old versions of software, for example. Examples of such rules would block all Skype traffic, block all YouTube video traffic, block all HipChat audio/video conferences when application version number is older than a particular version number, block data message flows for any application with a high threat score, etc.

In some examples, the load balancing engine 530 performs load balancing operations on data messages sent by the VMs 114 to distribute data message flows to different destination and/or service nodes in one or more destination/service node clusters. These load balancing operations are based on load-balancing rules in the rule storage 2140, for example. In some such examples, each load-balancing rule can specify one or more load balancing criteria (e.g. a round robin criterion, a weighted round-robin criteria, etc.) for distributing traffic, and each criteria can be limited to a particular time range. In some examples, a load balancing operation involves replacing a data message flow's destination network address (e.g., the destination IP address, the destination Media Access Control (MAC) address, etc.).

Some of the load-balancing rules are defined in terms of L2-L4 attributes (e.g., in terms of five-tuple identifiers, etc.). Other load-balancing rules are defined in terms of contextual attributes that can include one or more of the collected contextual attributes, such as application names, application versions, AppID, resource consumption, threat level, user ID, group ID, etc. In some examples, load-balancing rules are defined in terms of both L2-L4 parameters and contextual attributes. In such examples, since the load balancing engine 530 can resolve load balancing rules that are defined by reference to contextual attributes, the load balancing engine 530 is referred to as a context-based load balancer.

In some examples, the context-based load balancer 530 can distribute the data message flows based on one or more contextual attributes because its load-balancing rules can be identified in terms of a combination of one or more of the collected contextual attributes. For example, the data distribution of the load balancer 530 can be based on a combination of user and application data. Examples of such load balancing operations include: (1) distributing data message flows associated with the Finance department on all load balancing pools, (2) redirecting all the Finance department's traffic to another pool when the primary pool for this department is down to make this department's traffic highly available, (3) making all traffic associated with the Doctor's user group highly available, etc. In some examples, the load balancing rules can also be defined in terms of collected resource consumption to distribute traffic to provide resources to applications that consume resources on the VMs 114.

In some examples, the process control engine 526 enforces context-based process control operations (e.g., process assessment and termination operations, etc.) on processes started on the VMs 114. In some examples, when the context engine 2110 receives a new process event from the GI agent 2150, the context engine 2110 provides the process parameters associated with the process event to the process control engine 526. The process control engine 526 then uses the received set of process parameters to examine its service rule storage 2140 to identify a matching context-based, process-control rule.

In some examples, the process control engine 526 can instruct the context engine 2110 to direct the GI agent 2150 of the VM 114 to perform a process-control operation on a process. Examples of such process-control operations include (1) terminating a video conference application that has a particular version number, (2) terminating a browser that is displaying YouTube traffic, (3) terminating applications that have a high threat level score, etc.

In some examples, the discovery engine 2120 captures new process events and new network events from the context engine 2110, along with the contextual attributes that the context engine 2110 collects for these process and/or network events. The discovery service engine 2120 then events and their associated contextual attributes to one or more network managers (e.g., servers) that provide a management layer that allows network administrators to visualize events in a datacenter and specify policies for compute and network resources in the datacenter.

In relaying these events and attributes to the network management or policy layer, the discovery engine 2120 can perform some pre-processing of these events and attributes. For example, the discovery engine 2120 filters some of the network or process events, while aggregating some or all of these events and their attributes. Also, in some examples, the discovery engine 2120 directs the context engine 2110 to collect additional contextual attributes for process or network events through the GI agents 2150 and/or other modules (e.g., the DPI engine 2135, threat detection engine 2132, etc.), and/or to capture other types of events, such as file events and system events.

In some examples, the discovery engine 2120 directs the context engine 2110 to build an inventory of the applications installed on the VMs 114 and to periodically refresh this inventory. The discovery engine 2120 can direct the context engine 2110 at the request of the management plane and/or based on operational configurations that the management or control plane specifies for the discovery engine 2120. In some examples, in response to the request from the discovery engine 2120, the context engine 2110 instructs each GI agent 2150 on each VM 114 to discover installed processes on the machine, as well as all running processes and services.

After building an inventory of installed applications and the running processes/services, the discovery engine 2120 of the host computer 110 in the datacenter provides the inventory information to network/computer managers in the management plane 230. In some examples, the management plane 230 collects contextual attributes from sources other than the host computer 110 discovery engine 2120 and context engine 2110. For example, the management plane 230 collects from one or more servers compute context (e.g., cloud context from cloud vendors, compute virtualization context by datacenter virtualization software, etc.), identity context from directory service servers, mobility context from mobility management servers, endpoint context from DNS (domain name server) and application inventory servers, network context (e.g., virtual network context from network virtualization server, etc.), etc.

By collecting the contextual information (e.g., information from the discovery and context engines and/or information from other context sources), the management plane 230 can provide a user interface to the network/compute administrators to visualize the compute and network resources in the datacenter. Moreover, the collected contextual attributes allow the management plane 230 to provide controls through this user interface for these administrators to specify context-based service rules and/or policies. These service rules/policies are then distributed to the host computers 110 so that service engines 2130 on these computers can perform context-based service operations, for example.

In some examples described above, the same service engine 2130 (e.g., the same firewall engine 522, 524, etc.) performs the same type of service (e.g., a firewall service, etc.) based on service rules that can be defined in terms of message flow identifiers (e.g., five-tuple identifiers, etc.) and/or in terms of collected contextual attributes (e.g., AppID, threat level, user identifier, group identifier, application name/version, etc.) associated with the data message flows. In other examples, however, different service engines 2130 provide the same type of service based on the message flow identifiers (e.g., five-tuple identifiers, etc.) and based the collected contextual attributes of the data message flows. For example, a flow-based firewall engine 522, 524 can be used to perform firewall operations based on rules defined in terms of flow identifiers, and another context-based firewall engine 522, 524 can be used to perform firewall operations based on rules defined in terms of context attributes (e.g., AppID, threat level, user identifier, group identifier, application name/version, etc.).

FIG. 22 illustrates a more-detailed example of a host computer 110 that can be used to establish a distributed architecture to configure and perform context-rich, attribute-based services in a datacenter (e.g., a software-defined data center or SDDC). The implementation of the host computer 110 shown in the example of FIG. 22 includes many of the same components as the example implementation shown in FIG. 21, such as the network virtualization manager 1102 including context engine 2110, service engine(s) 2130, threat detector 2132, DPI module 2135, attribute-based service rule storage 2140, and context attribute storage 2145. As with the example of FIG. 21, the service engines 2130 in FIG. 22 include the discovery engine 2120, the process control engine 526, the load balancer 530, and the firewall engine 522, 524.

In the example of FIG. 22, the DCNs are VMs 114 that execute on a hypervisor 510. Also, in the example of FIG. 22, the host computer 110 and its network virtualization manager 1102 include a software forwarding element 2210, an attribute-mapping storage 2223, a connection state data storage 2225, a multiplier (mux) 2227, and a context-engine policy storage 2243. In some examples, the context engine 2110, the software forwarding element 2210, the service engine(s) 2130, the rule data storage 2140, the connection state data storage 2225, the context-engine policy storage 2243, and the mux 2227 are instantiated in a kernel space of the hypervisor, while the VMs 114 are instantiated in a user space of the hypervisor 510. In other examples, one or more service engines 2130 are instantiated as user space modules (e.g., are service VMs, etc.).

In some examples, the VMs 114 serve as data end points in the datacenter. Examples of such machines include web-servers, application servers, database servers, etc. In some examples, the VMs 114 belong to one entity (e.g., an enterprise that operates the host 110, etc.). In other examples, the host executes in a multi-tenant environment (e.g., in a multi-tenant data center), and different VMs 114 can belong to one tenant or to multiple tenants.

As shown in the example of FIG. 22, each VM 114 includes a GI agent 2150 that interacts with the context engine 2110 to provide context attribute set(s) to the engine 2110 and to receive instructions and queries from the engine 2110. The interaction between the GI agent 2150 and the context engine 2110 is the same or similar to the interactions described above between the GI agents 250 and the context engine 2110. However, as shown in the example implementation of FIG. 22, communication between the context engine 2110 and the GI agent(s) 2150 is relayed through the mux 2227 (e.g., an Endpoint Security (EPSec) platform mux for ESX hypervisors provided by VMware, Inc., etc.).

In some examples, the GI agent(s) 2150 communicate with the mux 2227 through a fast communication channel (e.g., virtual machine communication interface (VMCI) channel of the ESX hypervisor, etc.). In some examples, the communication channel is a shared memory channel. As described above, the attributes collected by the context engine 2110 from the GI agent(s) 2150 include a rich group of parameters (e.g., layer 7 parameters, process identifiers, user identifiers, group identifiers, process name, process hash, loaded module identifiers, consumption parameters, etc.)

As shown in the example of FIG. 22, each VM 114 also includes a virtual network interface card (VNIC) 2255. Each VNIC 2255 is responsible for exchanging messages between its VM 114 and the software forwarding element (SFE) 2210. Each VNIC 2255 connects to a particular port of the SFE 2210. The SFE 2210 also connects to a physical network interface card (NIC) (not shown) of the host computer 110. In some examples, the VNICs 2255 are software abstractions created by the hypervisor 510 of one or more physical NICs (PNICs) of the host 110.

In some examples, the SFE 2210 maintains a VNIC port 2260 for each VNIC 2255 of each VM 114. The SFE 2210 connects to the host PNIC (e.g., through a NIC driver) to send outgoing messages and to receive incoming messages. In some examples, the SFE 2210 is defined to include a PNIC port 2265 that connects to the PNIC's driver to send and receive messages to and from the PNIC. The SFE 2210 performs message-processing operations to forward messages that the SFE 2210 receives on one of its ports 2260, 2265 to another one of its ports 2260, 2265. For example, the SFE 2210 tries to use data in the message (e.g., data in the message header, etc.) to match a message to flow based rules, and, upon finding a match, to perform the action specified by the matching rule (e.g., to convey the message to one of its ports 2260 or 2265, which directs the message to be supplied to a destination VM 114 or to the PNIC, etc.).

In some examples, the SFE 2210 is a software switch. In other examples, the SFE 2210 is a software router or a combined software switch/router. In some examples, the SFE 2210 implements one or more logical forwarding elements (e.g., logical switches or logical routers, etc.) with the SFE 2210 executing on other hosts in a multi-host environment. In some examples, a logical forwarding element can span multiple hosts to connect VMs 114 that execute on different hosts but belong to one logical network.

Different logical forwarding elements can be defined to specify different logical networks for different users, and each logical forwarding element can be defined by multiple software forwarding elements 2210 on multiple hosts 110. Each logical forwarding element isolates the traffic of the VMs 114 of one logical network from the VMs 114 of another logical network that is serviced by another logical forwarding element. A logical forwarding element can connect VMs 114 executing on the same host 110 and/or different hosts 110. In some examples, the SFE 2210 extracts a logical network identifier (e.g., a VNI) and a MAC address from a data message. The SFE 2210 uses the extracted VNI to identify a logical port group and then uses the MAC address to identify a port within the port group, for example.

In some examples, the ports 2260, 2265 of the SFE 2210 include one or more function calls to one or more modules that implement special input/output (IO) operations on incoming and outgoing messages that are received at the ports 2260, 2265. Examples of IO operations that are implemented by the ports 2260, 2265 include Address Resolution Protocol (ARP) broadcast suppression operations and Dynamic Host Configuration Protocol (DHCP) broadcast suppression operations, as described in U.S. Pat. No. 9,548,965. Other IO operations (such as firewall operations, load balancing operations, network address translation operations, etc.) can be similarly implemented using the ports 2260, 2265. By implementing a stack of such function calls, the ports 2260, 2265 can implement a chain of IO operations on incoming and/or outgoing messages, for example. Also, in some examples, other modules in the data path (such as the VNICs 2255, port 2265, etc.) implement the IO function call operations, instead of, or in conjunction with, the ports 2260, 2265.

In some examples, one or more of function calls of the SFE ports 2260 can be to one or more service engines 2130 that process context-based service rules in the context-based service rule storage 2140. In some examples, each service engine 2130 has its own context-based service rule storage 2140, attribute mapping storage 2223, and connection cache storage 2225. For purposes of simplicity, FIG. 22 illustrates an example implementation with one service rule storage 2140, attribute mapping storage 2223, and connection cache storage 2225 for the service engines 2130. Also, in some examples, each VM 114 has its own instance of each service engine 2130 (e.g., its own instance of discovery engine 2120, process control engine 526, load balancer 530, and firewall engine 522, 524). In other examples, one service engine 2130 can service data message flows for multiple VMs 114 on a host 110 (e.g., VMs for the same logical network).

In some examples, to perform its service operation for a data message flow, the service engine 2130 tries to match the flow identifier (e.g., the five-tuple identifier, etc.) and/or the flow's associated context attribute set to the rule identifiers of its service rules in its service rule data storage 2140. Specifically, for the service engine 2130 to perform its service check operation for a data message flow, the SFE port 2260 that calls the service engine 2130 supplies a set of attributes of a message that the port 2260 receives. In some examples, the set of attributes are message identifiers, such as traditional five-tuple identifiers. In some examples, one or more of the identifier values can be logical values that are defined for a logical network (e.g., can be IP addresses defined in a logical address space, etc.). In other examples, the identifier values are defined in the physical domains. In still other examples, some of the identifier values are defined in the logical domain, while other identifier values are defined in the physical domain.

In some examples, the service engine 2130 then uses the received message's attribute set (e.g., the message's five-tuple identifier, etc.) to identify the context attribute set that the service engine 2130 has stored for this flow in the attribute-mapping storage 2223. As described above, the context engine 2110 can supply the context attributes for new flows (e.g., new network connection events) and for new processes to the service engine(s) 2130, along with a flow identifier (e.g., a five-tuple identifier, etc.) or a process identifier. The context-engine policy storage 2143 includes the rules that control the operation of the context engine 2110. In some examples, these policies direct the context engine 2110 to generate rules for the service engine(s) 2130 or to direct the service engine(s) 2130 to generate rules. The service engines 2130 store the context attributes that they receive from the context engine 2110 in the attribute-mapping storage 2223, for example.

In some examples, a service engine 2130 stores the context attribute set for each new flow or new process with that flow's identifier (e.g., five-tuple identifier) or that process' identifier in the attribute-mapping storage. The service engine 2130 can identify the context attribute set for each new flow that it receives from the SFE port 2260 by searching its attribute-mapping storage 2223 for a context record that has a matching flow identifier. The context record with the matching flow identifier includes the context attribute set for this flow. Similarly, when identifying the context attribute set for a process event, a service engine 2130 searches its attribute-mapping storage 2223 for a context record with a matching process identifier, for example.

In some examples, the service engine(s) 2130 can pull the context attribute sets for a new flow or new process from the context engine 2110. For example, the service engine 2130 supplies a new flow's five-tuple identifier that it receives from the SFE port 2260 to the context engine 2110. The context engine 2110 then examines its attribute storage 2145 to identify a set of attributes that is stored for this five-tuple identifier and supplies this attribute set (or a subset of it that it obtains by filtering the identified attribute set for the service engine 2130) to the service engine 2130, for example.

Some examples implement the pull model using a service token to encode the attribute set for a new message flow. When notified of a new network connection event, the context engine 2110 (1) collects the context attribute set for the new event, (2) filters this set to discard the attributes that are not relevant for performing one or more services on the flow, (3) stores the remaining filtering attribute subset in the attribute storage 2145 along with a service token, (4) provides the service token to the GI agent 2150, which causes this token to be passed to the service engine(s) 2130 in-band (e.g., tunnel header, etc.) and/or out-of-band. When the service engine 2130 gets the new flow through the SFE port 2260, the service engine 2130 supplies the flow's service token to the context engine 2110, which uses the service token to identify the context attributes in the storage 2145 to supply to the service engine 2130. In examples in which the SFE port 2260 does not provide this service token to the service engine 2130, the service engine 2130 first identifies the service token by searching its data stores using the flow's identifier before supplying the service token to the context engine 2110.

In some examples, after identifying the contextual attribute set for a data message flow, the service engine 2130 performs its service operation based on service rules that are stored in the service rule storage 2140. To perform its service operation, the service engine 2130 matches the received attribute subset with corresponding attribute sets that are stored for the service rules. In some examples, each service rule in the data storage 2125 has a rule identifier and an action parameter set. As described above, the rule identifier of a service rule can be defined in terms of one or more contextual attributes that are not L2-L4 header parameters (e.g., are L7 parameters, process identifiers, user identifiers, group identifiers, process name, process hash, loaded module identifiers, consumption parameters, etc.). In some examples, a rule identifier can also include L2-L4 header parameters. Also, in some examples, one or more parameters in a rule identifier can be specified in terms of an individual value or a wildcard value. Also, in some examples, a rule identifier can include a set of individual values or a group identifier, such as a security group identifier, a compute construct identifier, a network construct identifier, etc.

To match a received attribute set with the rules, the service engine 2130 compares the received attribute set with the associated identifiers of the service rules stored in the service rule data storage 2140. Upon identifying a matching rule, the service engine 2230 performs a service operation (e.g., a firewall operation, a load balancing operation, other middlebox operation, etc.), based on the action parameter (e.g., based on Allow/Drop parameter, the load balancing criteria, etc.) of the matching rule.

In some examples, the service rule data storage 2140 is defined in a hierarchy to help ensure that a message rule check will match a higher priority rule before matching a lower priority rule, when the message's attribute subset matches multiple rules. Also, in some examples, the service rule data storage 2140 includes a default rule that specifies a default action for a message rule check that cannot identify other service rules. In some examples, the default rule is a match for all possible attribute subsets, and helps ensure that the service rule engine 2130 returns an action for all received attribute subsets. In some examples, the default rule specifies no service.

Multiple messages can have the same message identifier attribute sets (e.g., when the messages are part of one flow that is associated with one communication session between two machines). Accordingly, after matching a data message with a service rule in the storage 2140 based on the message's identified context attribute set, the service engine 2130 can store the service rule (or a reference to the service rule) in the connection state data storage 2125 so that the service engine 2130 can later use this service rule for subsequent data messages of the same flow, for example.

In some examples, the connection state data storage 2225 stores the service rule, or a reference to the service rule, that the service engine 2130 identifies for different message identifier sets (e.g., for different five-tuple identifiers that identify different data message flows). In some example, the connection state data storage 2225 stores each service rule, or reference to the service rule, with an identifier (e.g., a flow's five-tuple identifier and/or a hash value of the flow's five-tuple identifier, etc.) that is generated from the matching message identifier set.

Before checking with the service rule data storage 2140 for a particular message, in some examples, the service rule engine 2130 checks the connection state data storage 2225 to determine whether the storage 2225 has previously identified a service rule for this message's flow. If not, the service engine 2130 identifies the contextual attribute set for the message flow, and then checks the service rule data storage 2140 for a service rule that matches the message's identified attribute set and/or its five-tuple identifier, for example. When the connection state data storage has an entry for the particular message, the service engine 2130 performs its service operation based on the service rule's action parameter set.

In the service architecture example of FIG. 22, the DPI module 2135 performs deep packet inspection on a data message flow at the direction of the firewall engine 522, 524. Specifically, when the firewall engine 522, 524 receives a new data message that is part of a new data message flow, the firewall engine 522, 524 can, in some examples, direct the DPI module 2135 to inspect the new data message and one or more of the next few data messages in the same flow. Based on the examination, the DPI engine 2135 identifies the type of traffic (e.g., an application on the wire, etc.) that is being sent in the data message flow, generates an AppID for this traffic type, and stores this AppID in the attribute storage 2145. In some examples, the context attribute sets are stored in the attribute storage based on flow identifiers and/or process identifier. Accordingly, in some examples, the DPI engine 2135 stores the AppID for a new data message flow in the attribute storage 2145 based on that flow's five-tuple identifier.

In some examples, the context engine 2110 pushes the AppID for a new data message flow to the service engine(s) 230 once the DPI engine 2135 stores the AppID in the attribute storage 2145. In other examples, the context engine 2110 pulls the AppID from the storage 2145 whenever the engine 2110 is queried for the contextual attributes for a data message flow by the service engine 2130, again by using the five-tuple identifier of the flow to identify the record in the attribute storage 2145 with the matching record identifier and the AppID.

Figure 23:
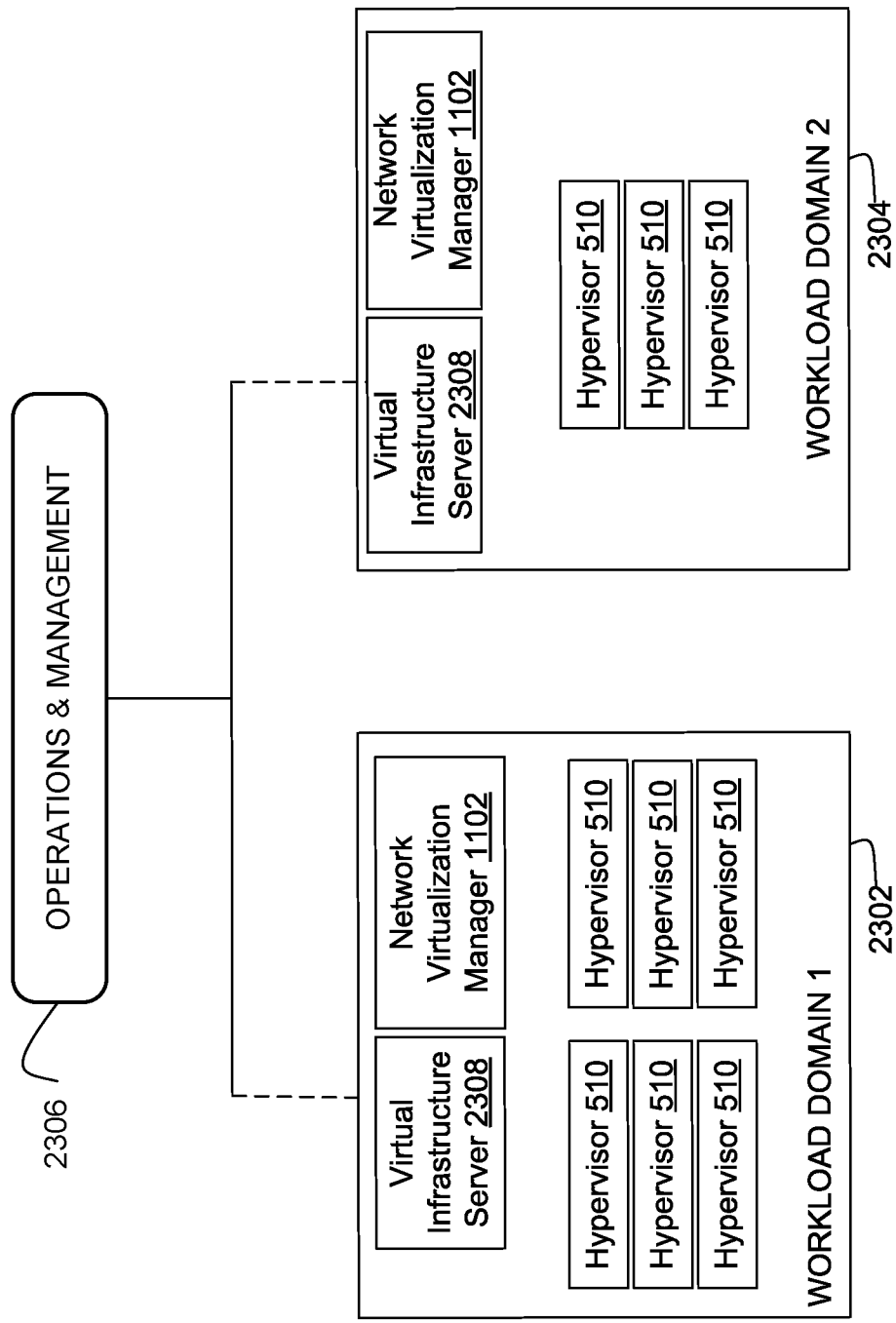
FIG. 23 depicts two example workload domains executing in conjunction with an operations and management component.

The example network virtualization manager 1102 can be organized according to one or more workload domains coordinated by an operations and management component (e.g., working in conjunction with and/or included in the example system 100). FIG. 23 depicts two example workload domains 2302, 2304 executing in conjunction with an operations and management component 2306. The example workload domains 2302, 2304 are used to provision capacity based on user inputs that specify one or more of domain type, security, availability requirements, performance requirements, and capacity requirements. Based on these user inputs, the operations and management component 2306 determines whether a deployment is possible. If a deployment is possible, the operations and management component 2306 determines a host set that meets the user-specified requirements. The output of the operations and management component 2306 is a fully configured system with suitable management components, capacity, and settings that meet the user-specified requirements.

In the illustrated example, the workload domains 2302, 2304 use a policy-driven approach to capacity deployment. The policy for each workload domain 2302, 2304 can be specified and changed by a user (e.g., customer). Each of the example workload domains 2302, 2304 is an atomic unit for deployment, upgrading, and deletion. In the illustrated example, the workload domains 2302, 2304 are provided with algorithms that determine host placement to meet user provided requirements. The management components for each of the workload domains 2302, 2304 of the illustrated example can run on one or more management clusters. Each management cluster can run on a single physical rack or across multiple physical server racks depending on availability and capacity requirements.

In the illustrated examples disclosed herein, domain types include an infrastructure as a service (IaaS) domain type, a platform as a service (PaaS) domain type, a desktop as a service (DaaS)/virtual desktop infrastructure (VDI) domain type, a development/test domain type, a production domain type, a Cloud Native domain type, an Openstack domain type, and a Big Data domain type. However, any other domain type may be used. In the illustrated example, security types include firewall settings, security group settings, particular specified IP addresses, and/or other network security features. In the illustrated example, availability requirements refer to durations of continuous operation expected for a workload domain. Example availability requirements also refer to configuring workload domains so that one workload's operability (e.g., malfunction, unexpected adverse behavior, or failure) does not affect the availability of another workload in the same workload domain. In the illustrated example, performance requirements refer to storage configuration (e.g., in terms of megabytes (MB), GB, terabytes (TB), etc.), CPU operating speeds (e.g., in terms of megahertz (MHz), GHz, etc.), and power efficiency settings. Example performance requirements also refer to configuring workload domains so that concurrent workloads in the same workload domain do not interfere with one another. Such non-interference between concurrent workloads may be a default feature or may be user-specified to different levels of non-interference. In the illustrated example, capacity requirements refer to the number of resources required to provide availability, security, and/or performance requirements specified by a user. Allocating capacity into workload domains in accordance with the teachings of this disclosure enables providing workload domains with isolation from other workload domains in terms of security, performance, and availability. That is, security, performance, and availability for one workload domain can be made distinct separate from security, performance, and availability from other workload domains. For example, techniques disclosed herein enable placing a workload domain on a single physical rack separate from other workload domains in other physical racks such that a workload domain can be physically isolated from other workload domains in addition to being logically isolated. Additionally, techniques disclosed herein facilitate placing a workload domain across numerous physical racks so that availability requirements of the workload domain are met even when one physical rack fails (e.g., if one physical rack fails, resources allocated to the workload domain from one or more other physical racks can ensure the availability of the workload domain).

As shown in the example of FIG. 23, each workload domain 2302, 2304 includes a network virtualization manager 1102 (e.g., VMware NSX®, etc.) operating in conjunction with a virtual infrastructure server 2308 (e.g., VMware vCenter®, etc.). The virtual infrastructure server 2308 provides centralized management of a virtualization infrastructure (e.g., a VMware vSphere® virtualization infrastructure, etc.). For example, the virtual infrastructure server 2308 provides centralized management of virtualized hosts and virtual machines from a single console to provide IT administrators with access to inspect and manage configurations of components of the virtual infrastructure.

The example hypervisor component 510 is a hypervisor (e.g., VMware ESXi™, etc.) that is installed and runs on servers in example physical resources to enable the servers to be partitioned into multiple logical servers to create virtual machines. Network resources, such as physical hardware switches, can be virtualized to provide software-based virtual networks. An example network virtualization platform enables treating physical network resources (e.g., switches) as a pool of transport capacity and provides network and security services to virtual machines with a policy driven approach.

The example network virtualization manager 1102 (e.g., VMware NSX®, etc.) manages virtualized network resources such as physical hardware switches to provide software-based virtual networks. In the illustrated example, the network virtualization manager 1102 is a centralized management component of the network virtualization platform and runs as a virtual appliance on a hypervisor 510 host. In the illustrated example, the network virtualization manager 1102 manages a single server environment implemented using the virtual infrastructure server 2308. In the illustrated example, the network virtualization manager 1102 is in communication with the virtual infrastructure server 2308, the hypervisor 510 with respect to the network virtualization platform for the workload domain 2302, 2304.

In certain examples, the hypervisors 510 in a corresponding workload domain 2302, 2304 share common software-defined network data storage (e.g., VMware vSAN™, etc.), high availability (HA), distributed resource scheduler (DRS), etc. In certain examples, a network data storage virtualization component (not shown) is software-defined storage that clusters server-attached hard disk drives (HDDs) and solid state drives (SSDs) to create a shared datastore for use as virtual storage resources in virtual environments, for example.

Figure 24:
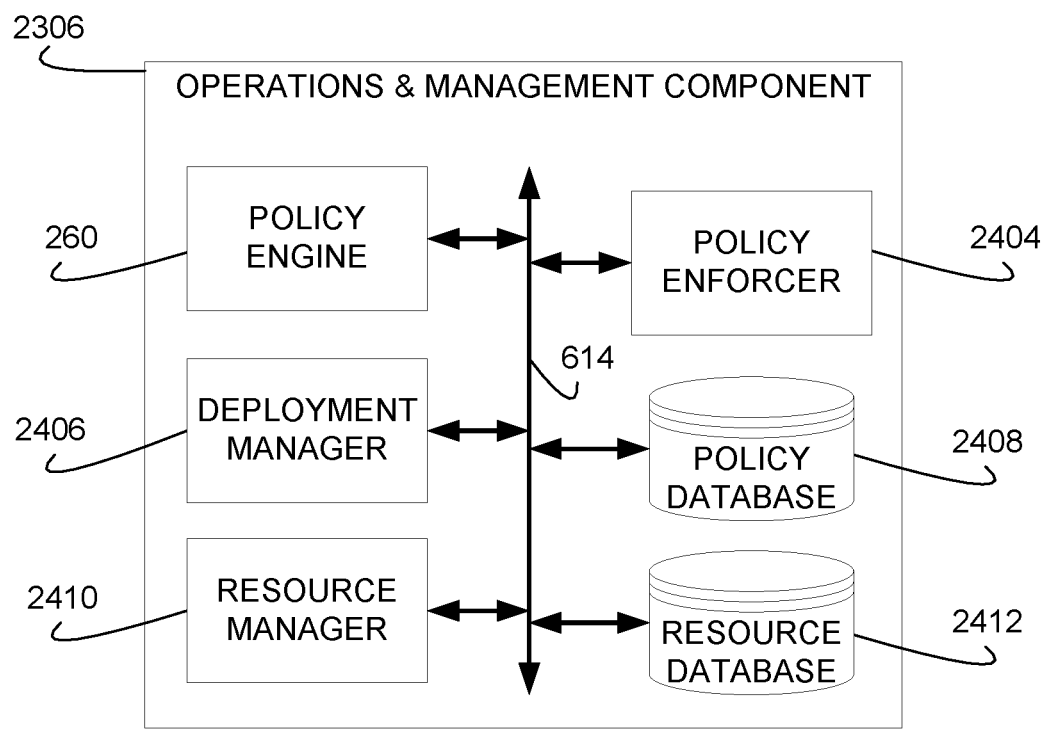
FIG. 24 illustrates an example implementation of the operations and management component.

An example of the operations and management component 2306 is illustrated in FIG. 24. The operations and management component 2306 can be implemented as a distributed SDDC manager 2306, for example. The example operations and management component 2306 includes an example policy engine 260, an example policy enforcer 2404, an example deployment manager 2406, an example policy database 2408, an example resource manager 2410, and an example resource database 2412. In the illustrated example of FIG. 24, the policy engine 2260, the policy enforcer 2404, the deployment manager 2406, the policy database 2408, the resource manager 2410, and the resource database 2412 are all in communication with one another via a bus 2414. The policy components can operate at a management/policy layer of the network to coordinate and/or otherwise manage virtualized network operations, for example.

As disclosed herein, the example operations and management component 2306 determines placement solutions for workload domains, manages the addition and/or removal of capacity according to policies, and deploys workload domains based on user-selected availability, performance, and capacity options. The example operations and management component 2306 operates on a number of user requests concurrently to determine a number of placement solutions concurrently within a finite pool of shared configuration resources. Accordingly, the example operations and management component 2306 services the number of user requests in a more timely fashion than achievable without the disclosed techniques. For example, the operations and management component 2306 identifies first ones of a plurality of computing resources to form a first placement solution for a first workload domain based on availability, performance, and capacity options selected by a first user, and concurrently identifies second ones of the plurality of computing resources different from the first ones of the plurality of computing resources to form a second placement solution for a second workload domain based on availability, performance, and capacity options selected by a second user.

The example policy engine 260 determines availability options, performance options, and/or capacity options for a workload domain. In some examples, the policy engine 260 creates, updates, and/or deletes one or more policies based on the availability options, performance options, and/or capacity options selected by a user. The example policy engine 260 can communicate with a user interface to present options to a user and receive selections of such options from the user. In some examples, the policy engine 260 determines availability options and performance options for a workload domain based on a user-selected workload domain type. As disclosed herein, a user may select domain types such as, for example, an IaaS domain type, a PaaS domain type, a DaaS/VDI domain type, a development/test domain type, a production domain type, a Cloud Native domain type, an Openstack domain type, a Big Data domain type, etc. In some examples, different domain types may be associated with one or more predetermined availability and/or performance options. For example, the policy engine 260 may access a look-up-table for default availability and/or performance options associated with the domain types described above. The example policy engine 260 presents one or more availability and/or performance options to a user for selection thereof. In some examples, the policy engine 260 presents the availability and/or performance options to a user at a low level of detail (e.g., low redundancy, normal redundancy, high redundancy 1, high redundancy 2, low performance, normal performance, high performance, etc.), such that the user need not understand the physical resources required to provide such availability and/or performance. In some examples, the policy engine 260 presents the availability and/or performance options at a high level of detail (e.g., sliding scales representative of a number of redundant resources, CPU operating speeds, memory, storage, etc.).

Based on the user-selected availability option(s) and/or performance option(s), the example policy engine 260 determines one or more capacity option(s) capable of providing the user-selected availability option(s) and/or performance option(s). For example, the policy engine 260 determines the number of resources required provide the user-selected availability option(s) and/or performance option(s). In some examples, the policy engine 260 determines and presents a plurality of capacity options to the user (e.g., four host resources could provide the user-selected availability option(s) and/ performance option(s), but five resources would be better). In some examples, the policy engine 260 determines and presents one capacity option to the user. In some examples, the policy engine 260 determines no capacity options are available to the user based on the selected availability option(s) and/or performance option(s). In such examples, the policy engine 260 presents to the user that there are no capacity options. In some such examples, the policy engine 260 provides recommendations to a user for adjusting the availability option(s) and/or performance option(s) to make one or more capacity options available. In some such examples, multiple workload domains share a finite pool of computation resources such that capacity options may become unavailable due to a lack of resources. However, as disclosed herein, resources are allocated to different workload domains and/or de-allocated from workload domains such that capacity options may become available for the user-selected availability option(s) and/or performance option(s) at a later time. In some examples, portions of the shared pool of configurable computing resources are reserved to provide failure tolerance. In some examples, such reserved computing resources may be used when the policy engine 260 determines that no non-reserved capacity options are available to the user based on the selected availability option(s) and/or performance option(s).

In some examples, a user wishes to create, update, delete, and/or otherwise modify the one or more policies created by the policy engine 260 based on the availability, performance, and/or capacity options. For example, a user wants to increase capacity after a workload domain has been deployed. In such examples, the policy engine 260 defines, updates, deletes, and/or otherwise modifies the one or more policies based on instructions received from the user (e.g., through the user interface). The policy engine 260 stores information relating to the one or more polices in association with corresponding workload domains within the policy database 2408.

The example policy enforcer 2404 monitors the capacity of workload domains and compares the capacity of the workload domains to corresponding capacity policies (e.g., stored in the policy database 2408) to determine whether the capacity of the workload domain 2302 is in compliance with a policy capacity specified in the user-defined policy for the workload domain 2302. For example, if the workload domain 2302 is associated with a user-defined policy having a first policy capacity and the workload domain 2302 has a capacity different from the first policy capacity, the example policy enforcer 2404 determines that the workload domain 2302 is in violation of the user-defined policy. In some examples, the workload domain 2302 is in violation for having a capacity that exceeds the policy capacity specified in the user-defined policy (e.g., the policy capacity specified in the user-defined policy was lowered by the user). In some examples, the workload domain 2302 is in violation for having a capacity less than the policy capacity specified in the user-defined policy (e.g., the policy capacity specified in the user-defined policy was increased by the user). In some examples, such violations occur due to modifications to user-defined policies after a workload domain has been deployed (e.g., in response to the policy engine 260 defining, updating, deleting, or otherwise modifying the user-defined policy). Additionally or alternatively, compliance with a policy capacity may include the capacity of the workload domain 2302 satisfying an acceptable capacity range (e.g., within +/−5%). For example, if the policy capacity specified in the user-defined policy is one-hundred and the capacity of the workload domain 2302 is ninety-nine, the capacity of the workload domain 2302 may still be in compliance even though ninety-nine is less than one-hundred (e.g., 99 is within 5% of 100). Accordingly, non-compliance with a policy capacity may include the capacity of the workload domain 2302 not satisfying the acceptable capacity range (e.g., outside of +/−5%).

In some examples, the example policy enforcer 2404 categorizes existing workload domains based on a type of update to user defined policies. For example, the example policy enforcer 2404 may group together workload domains having updates reflecting a request for additional or a request to release excess CPU capacity, storage capacity, memory capacity, etc. In such examples, the example policy enforcer 2404 determines whether there is a second workload domain within a same category as the first workload domain that has excess capacity and/or is requesting additional capacity.

The example deployment manager 2406 determines placement solutions for workload domains within the shared pool of configurable computing resources. The example deployment manager 2406 determines what resources to allocate for workload domains based on the availability, performance, and capacity options selected by users. In some examples, the deployment manager 2406 determines one or more placement solutions for one or more workload domains (e.g., from one or more users) concurrently, simultaneously, or substantially simultaneously. In such examples, the deployment manager 2406 communicates with the resource manager 2410 to request/receive a most recent list of accessible resources from the shared pool of configurable computing resource prior to determining a placement solution. In some examples, the deployment manager 2406 requests the most recent list of resources to prevent allocating resources that have been allocated to another workload domain (e.g., a first workload domain is to have a first set of resources and a second workload domain is to have a second set of resources different from the first set of resources). Various placement solutions may be used including, selecting the least number of resources required to satisfy the capacity policy, selecting one more than the least number of resources required to satisfy the capacity policy, etc.

Once the deployment manager 2406 has a most recent list of accessible resources, the deployment manager 2406 determines a placement solution for a workload domain using the most recent list of accessible resources based on the availability, performance, and/or capacity options selected by a user. For example, if a user selects a multi-rack option, the deployment manager 2406 determines a placement solution in a virtual server rack across a plurality of physical racks (e.g., allocate resources across five different racks). In such examples, the deployment manager 2406 may allocate one resource per rack. Alternatively, the deployment manager 2406 may allocate all the resources of a first rack before moving to the next rack. In some examples, if a user selects a single-rack option, the deployment manager 2406 determines a vertical placement solution in a single physical rack (e.g., fill a single rack with one or more placement solutions).

In some examples, the deployment manager 2406 is to when ones of the capacities of the plurality of workload domains are less than the policy capacities of the respective user-defined policies, concurrently determine a plurality of placement solutions for additional capacity for the plurality of workload domains based on a comparative analysis of: (a) the capacities of the plurality of workload domains, (b) updates to the respective user-defined policies, and (c) a resource database shared by the multiple users, the resource manager to allocate resources to the plurality of workload domains based on the plurality of placement solutions.

The example deployment manager 2406 communicates with the example resource manager 2410 to reserve the resources associated with the placement solution. After the resources are reserved, the example deployment manager 2406 deploys the workload domain with the reserved resources based on the user-selected availability, performance, and/or capacity options.

The example policy database 2408 stores information relating to user-selected options for deploying a workload domain. For example, when a user selects an availability option, a performance option, and/or a capacity option, the policy manager 2402 may store this information in a user-defined policy corresponding to the workload domain. Additionally, the policy manager 2402 updates user-defined policies with the example policy database 2408 based on subsequent user-selections. Such workload domain and user-defined policy pairing may be stored in one or more look-up tables within the example policy database 2408. In some examples, the example policy database 2408 is a tangible computer readable storage device or storage disk such as a memory, a digital versatile disk (DVD), a compact disk (CD), a Blu-ray disk, etc.

The example resource manager 2410 reserves resources from the shared pool of configurable computing resources based on placement solutions determined by the deployment manager 2406. In some examples, the resource manager 2410 allocates resources to and/or de-allocates resources from workload domains. In some examples, the resource manager 2410 allocates and/or de-allocates resources between workload domains. In some such examples, the resource manager 2410 determines whether one or more workload domains can provide resource capacity requested by another workload domain and/or whether one workload domain can provide resource capacity requested by one or more workload domains. The example resource manager 2410 tracks the reservation, allocation, and/or de-allocation of resources by storing information associated with such reservation, allocation, and/or de-allocation of resources in the example resource database 2412.

The example resource database 2412 stores information regarding the status of the shared pool of configurable resources such as for example, resources allocated from the shared pool of configurable resources to workload domains and/or resources de-allocated from workload domains to the shared pool of configurable resources. The example deployment manager 2406 reads such status information for a most recent list of available resources prior to determining a placement solution. In some examples, the example resource database 2412 is a tangible computer readable storage device or storage disk such as a memory, a digital versatile disk (DVD), da compact disk (CD), a Blu-ray disk, etc.

While an example manner of implementing the example systems of FIGS. 1-6 and 21-24, data structures of FIGS. 7-10, and associated interfaces of FIGS. 11-20 are described above, one or more of the elements, processes and/or devices illustrated in FIGS. 1-6 and 21-24 can be combined, divided, re-arranged, omitted, eliminated and/or implemented in any other way. Further, the example network virtualization manager 1102, context engine 2110, context based services 2130, operations and management module 2306, hypervisor 510, policy engine 260, policy enforcer 2404, deployment manager 2406, resource manager 2410, context engine MP 240, context engine DP 250, and/or, more generally, the example systems 100, 110, 200, 1102 of FIGS. 1-6 and 21-24 can be implemented by hardware, software, firmware and/or any combination of hardware, software and/or firmware. Thus, for example, any of the example network virtualization manager 1102, context engine 2110, context based services 2130, operations and management module 2306, hypervisor 510, policy manager 2402, policy enforcer 2404, deployment manager 2406, resource manager 2410, context engine MP 240, context engine DP 250, and/or, more generally, the example systems 100, 110, 200, 1102 of FIGS. 1-6 and 21-24 can be implemented by one or more analog or digital circuit(s), logic circuits, programmable processor(s), application specific integrated circuit(s)

(ASIC(s)), programmable logic device(s) (PLD(s)) and/or field programmable logic device(s) (FPLD(s)). When reading any of the apparatus or system claims of this patent to cover a purely software and/or firmware implementation, at least one of the example network virtualization manager 1102, context engine 2110, context based services 2130, operations and management module 2306, hypervisor 510, policy engine 260, policy enforcer 2404, deployment manager 2406, resource manager 2410, context engine MP 240, context engine DP 250, and/or, more generally, the example systems 100, 110, 200, 1102 of FIGS. 1-6 and 21-24 is/are hereby expressly defined to include a tangible computer readable storage device or storage disk such as a memory, a digital versatile disk (DVD), a compact disk (CD), a Blu-ray disk, etc. storing the software and/or firmware. Further still, the example network virtualization manager 102, context engine 2110, context based services 2130, operations and management module 2306, hypervisor 510, policy engine 260, policy enforcer 2404, deployment manager 2406, resource manager 2410, context engine MP 240, context engine DP 250, and/or, more generally, the example systems 100, 110, 200, 1102 of FIGS. 1-6 and 21-24 may include one or more elements, processes and/or devices in addition to, or instead of, those illustrated in FIGS. 1-6 and 21-24, and/or may include more than one of any or all of the illustrated elements, processes and devices.

Flowcharts representative of example machine readable instructions that may be executed to deploy and manage the example network virtualization manager 1102, context engine 2110, context based services 2130, operations and management module 2306, hypervisor 510, policy engine 260, policy enforcer 2404, deployment manager 2406, resource manager 2410, context engine MP 240, context engine DP 250, and/or, more generally, the example systems 100, 110, 200, 1102 of FIGS. 1-6 and 21-24 are shown in FIGS. 25-30. In these examples, the machine readable instructions implement programs for execution by a processor such as the processor 3112 shown in the example processor platform 3100 discussed below in connection with FIG. 31. The programs may be embodied in software stored on a tangible computer readable storage medium such as a CD-ROM, a floppy disk, a hard drive, a digital versatile disk (DVD), a Blu-ray disk, or a memory associated with the processor 3112, but the entire program and/or parts thereof could alternatively be executed by a device other than the processor 3112 and/or embodied in firmware or dedicated hardware. Further, although the example programs are described with reference to the flowcharts illustrated in FIGS. 15-30, many other methods of automatically evaluating, instantiating in the policy plane, and managing via a user interface may alternatively be used in accordance with the teachings of this disclosure. For example, the order of execution of the blocks may be changed, and/or some of the blocks described may be changed, eliminated, or combined.

As mentioned above, the example processes of FIGS. 25-30 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 25-30 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 25:
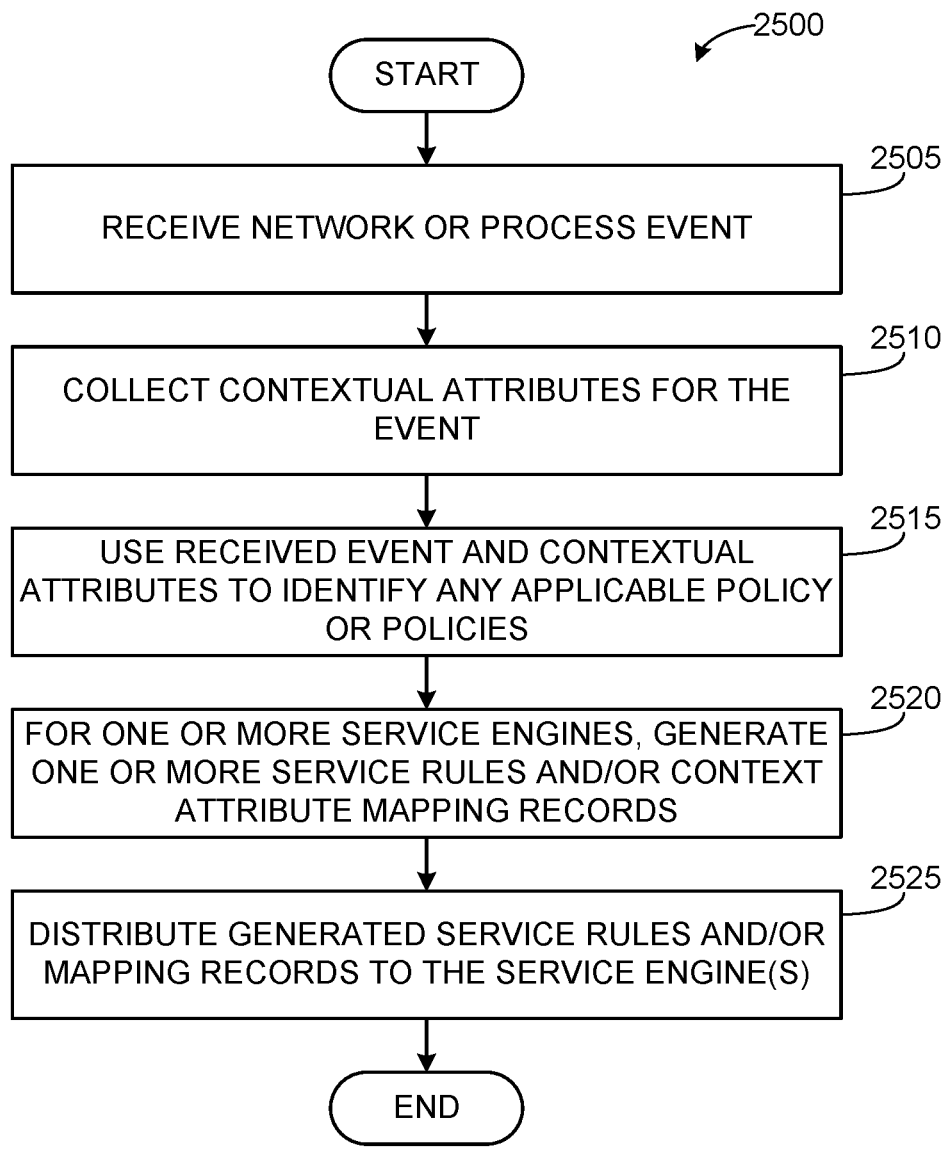
FIGS. 25-30 depict flowcharts representative of computer readable instructions that may be executed to implement example infrastructure installation.

FIG. 25 illustrates a flow diagram of an example process 2500 that the context engine 2110 performs in some examples when the context engine 2110 is notified about a new process or network-connection event. At block 2505, a notification regarding a new process or network connection event is received from the GI agent 2150 of a VM 114. Next, at block 2510, desired contextual attributes regarding the notified event are collected.

As described above, the context engine 2110 interacts with the reporting GI agent 2150 to collect additional information regarding a reported event. In some examples, the GI agent 2150 interacts with the network stack and/or process subsystem in the VM's OS kernel space to collect contextual attributes regarding a process or network event. In some examples, the GI agent 2150 also collects information from user-space modules (e.g., a user mode dynamic linked library (DLL), etc.) that operate in a user-space process (e.g., a VMtool.exe, etc.) to collect contextual attributes. For example, with VMs 114 using Microsoft Windows®, the GI agent 2150 registers hooks in the Windows Filtering Platform (WFP) to obtain network events, while registering in the Window's Process Subsystem to collect process related attributes. In some examples, the GI agent 2150 hook is at an Application Layer Enforcement (ALE) layer of the WFP, so that the GI agent 2150 can capture socket-connection requests from application processes on the VM 114.

In some examples, the context engine 2110 interacts with the management and/or control plane to collect contextual attributes, and/or to receive records that the engine 2110 can examine to identify contextual attributes for identified network or process events. In some such examples, the context engine 2110 interacts with a management and/or control plane proxy (that operates on its host) to obtain data from the management and/or control plane compute devices that operate outside of the host. In some of these examples, the context engine 2110 operates in the kernel space.

After collecting the contextual attributes at block 2510, at block 2515, attributes of the received event and/or the contextual attributes collected for the received event are used to identify one or more policies in the context-engine policy storage 2143. At block 2515, policy(-ies) that has/have a policy identifier that matches the collected attributes and event is/are identified. Next, at block 2520, context-attribute mapping records are produce for one or more service engines 2130 based on the policies identified at block 2515. For example, one or more of the identified policies can specify that, for a particular process or network event, a particular set of service engines 2130 is to be notified about the event (e.g., about a new data message flow, etc.), with each service engine 2130 receiving a subset of contextual attributes that are relevant for that service engine's 2130 perform its processing for that event. In some examples, this operation involves the context engine 2110 not including attributes that are not relevant for a particular service engine 2130 in the subset of contextual attributes that the engine 2110 provides to that particular service engine 2130.

In some examples, certain events can trigger creation of new service rule(s) for one or more service engines 2130. In some such examples, the policy storage 2143 includes policies that direct the context engine 2110 to generate service rules for service engines 2130 and/or to direct the service engines 2130 to generate such service rules. For such examples, at block 2520, service rules are generated for service engines 2130 and/or directs the service engines 2130 to generate such service rules.

At block 2525, mapping records and/or generated service rules/instructions are distributed to one or more service engines 2130. As described above, the context engine 2110 can employ a push model or a pull model to distribute such records and/or rules/instructions. In some examples, when employing a pull model, the distribution of block 2525 and all or part of the record production of block 2520 can be performed in response to a query from the service engine 2130.

Figure 26:
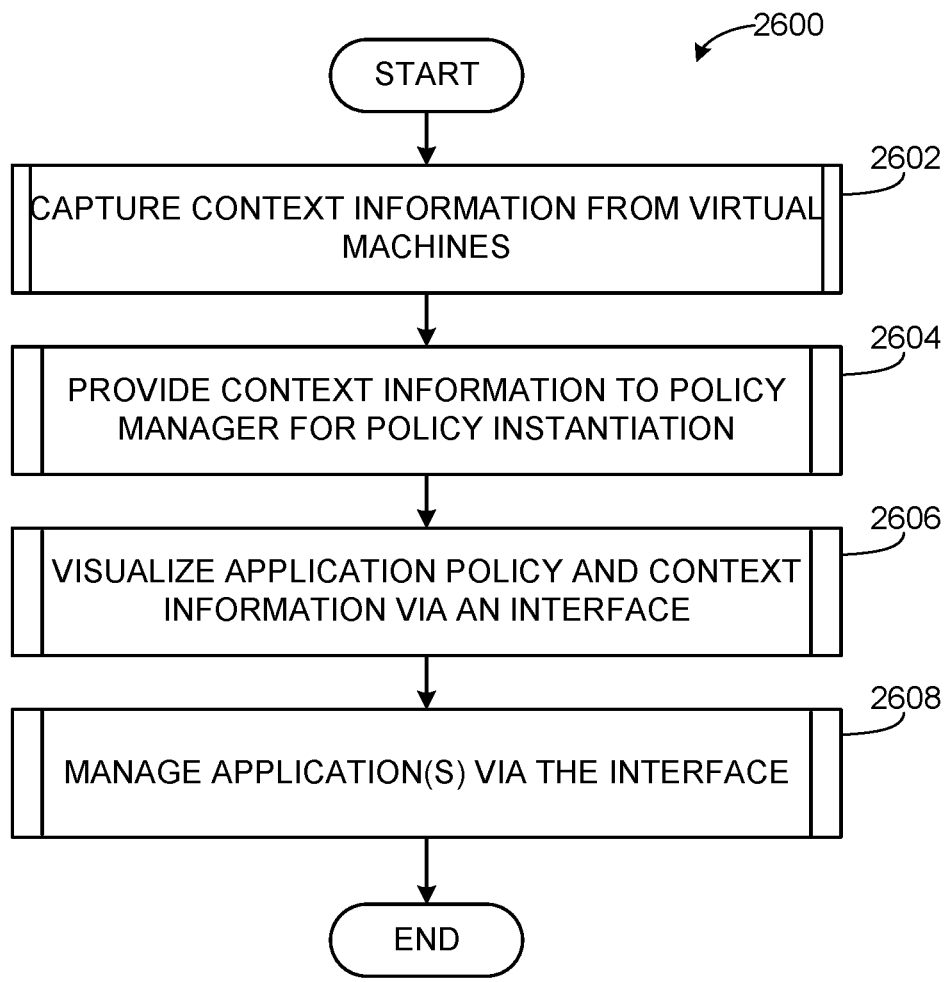

FIG. 26 depicts a flowchart representative of computer readable instructions that may be executed to implement the example management/policy layer 230, 235 application management. At block 2602, discovery is conducted among the VMs 114 by the context engine 2110 (e.g., the context engine MP 240 and the context engine DP 250) to identify and extract (e.g., capture) context information regarding user(s), application(s), etc., running on the VMs 114. For example, an application can be a single application running on a VM 114 and/or a multi-tiered application running on a plurality of VMs 114. Connection(s) between applications and/or other processes among VMs 114 on the hypervisor 510 and/or computing host 110 can be discovered, for example. Relationships between application tiers, VMs 114, etc., can be determined by the context engine 2110 in discovery. User logins and connecting/generating network flows can be discovered by the context engine 2110 running in the hypervisor 510.

In certain examples, agents 542-548 running on guest VMs 114 gather context information and provide the information to the context engine 2110. The context engine 2110 identifies application(s) running on a single VM 114, multiple VMs 114, etc., and forwards the information to the management 230 and/or policy 235 layer(s).

At block 2604, the context information is provided to the policy engine 260 to instantiate application entity(-ies) 302 in the policy plane 235. For example, the context engine DP 250 running in the data plane 210 identifies an executing application and a network layer on which the application is executing (e.g., L2, L3, etc.). The context engine DP 250 provides information to the context engine MP 240, which communicates with the context input processor 602 of the policy engine 260 in the policy plane 235. The context input processor 602 works with the policy generator 608 to generate a policy regarding the identified application, forming an application entity 302 representing the application running in the data plane 210, for example. For example, the context input processor 602 and the policy generator 608 of the policy engine 260 process the discovered application and relationship information, and the policy generator 608 generates a policy definition that describes the application as an entity and its rules, relationships, owner, etc. The policy definition can be used to generate an application entity 302 for the policy plane 235 (and/or the management plane 230, which can be combined with the policy plane 235 in some examples).

At block 2606, the application policy and context information are visualized via a graphical user interface. For example, as shown in the example user interfaces FIGS. 11-20, VM, application, and/or connectivity information can be visualized by the interface generator 610 as a graph, and a user can select an application to view similar applications and interconnections via the interface. Visualizations can be organized according to user, application, connectivity, flow, etc.

At block 2608, the application(s) the virtual network can be managed via the user interface. In certain examples, applications can be re-provisioned on VMs 114, VMs 114 can be re-provisioned, VMs 114 can be provisioned, networks can be provisioned, networks can be re-provisioned etc., for one or more applications based on the discovered information and connections and controls available through the example interfaces of FIGS. 11-20.

In certain examples, in addition to provisioning and/or re-provisioning, connections between tiers, etc., can be visualized, and improper connections can be blocked. For example, a web tier is to access an application tier, not a database tier, so an improper connection between the web tier and the database tier can be blocked. Additionally, connections to switches can be visualized via the interface(s), and application traffic can be load balanced between switches, for example.

In certain examples, a VM 114 can be quarantined based on malware detection. Connection and/or traffic can be prevented based on discovered information about the operating environment, for example.

In certain examples, the system configuration can be saved as a template to help a user form a new application with the same set of networks and services as an existing, identified application(s).

In certain examples, as discussed above, containers 114a as well as or in addition to VMs 114 can be used in discovery, policy generation, visualization, and management. With a VM 114, applications and network connections are monitored via the context engine 2110. For a container 114a, data mining can discover from which container 114a file accesses are being made. The context engine 2110 can identify which application is accessing which container 114a, for example.

Additionally, certain examples provide a cloud-based implementation, in which the management plane 230 (and/or included or separate policy plane 235) and network virtualization manager 1102 are run in a cloud (e.g., an Amazon cloud, Azure cloud, etc.). Thin agents 542-548 run in the cloud to gather information. If agents 542-548 are installed in VMs 114 running on the cloud, application, user, connectivity, and/or other information can be gathered from a cloud-based implementation as well.

Thus, certain examples facilitate discovery of context from the network visualization manager 1102 and VMs 114 in the data center/host 110. The context is used to visualize and provide an ability to create virtual networks and add services on top of the network for the application(s). In certain examples, a template can be generated from a configuration to facilitate repeatability and stability with virtual network configuration and virtual machine management.

Figure 27:
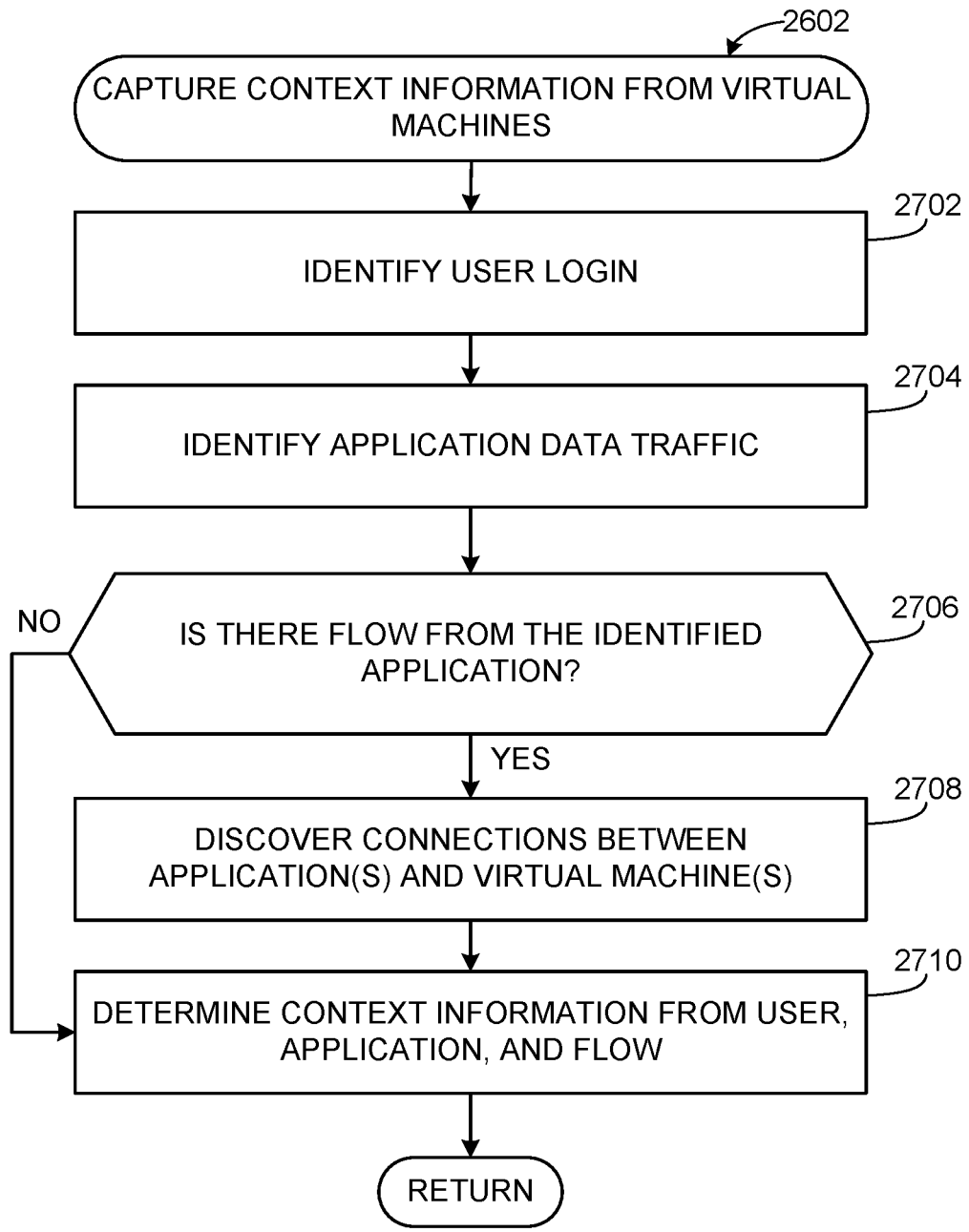

FIG. 27 provides additional example detail regarding capture of context information from virtual machines (block 6202 of the example of FIG. 26). At block 2702, user login information is identified. For example, the context engine 2110 can detect user login data traffic with respect to the VM 114 and/or the overall virtual network management 1102. User login information can be used to group application(s) and/or other process(es) by relevant user, user group, user type, etc.

At block 2704, application data traffic is identified. For example, the context engine 2110 (e.g., the context engine MP 240 and the context engine DP 250) queries the VMs 114 (e.g., using agents 542-548, etc.) to identify and extract (e.g., capture) context information regarding application(s), etc., running on the VMs 114.

At block 2706, application data traffic is analyzed by the context engine 2110 to determine whether there is flow from the application to another application and/or VM 114. If flow is identified, then, at block 2708, connections between application(s) and/or VMs 114 are identified. For example, an application can be a single application running on a VM 114 and/or a multi-tiered application running on a plurality of VMs 114. Connection(s) between applications and/or other processes among VMs 114 on the hypervisor 510 and/or computing host 110 can be discovered, for example. Relationships between application tiers, VMs 114, etc., can be determined by the context engine 2110 in discovery. User logins and connecting/generating network flows can be discovered by the context engine 2110 running in the hypervisor 510.

At block 2710, context information is determined based on the gathered user, application, and flow/connection information. The context engine 2110 processes and organizes the context information and provides the information to the policy engine 260 in the policy plane 235 (or management plane 230 if the policy and management planes are integrated 230).

Figure 28:
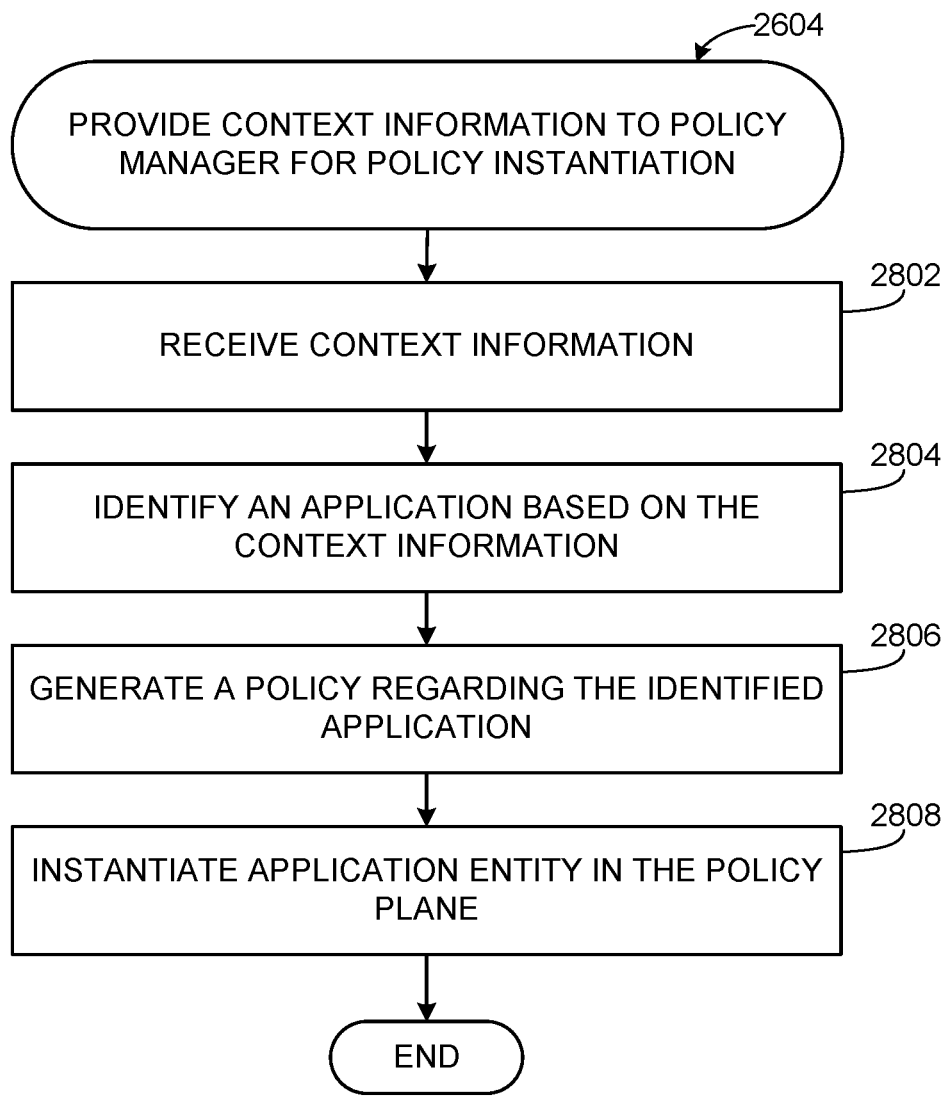

FIG. 28 provides additional example detail regarding providing the context information to the policy engine 260 for policy instantiation (block 2604 of the example of FIG. 26). At block 2802, context information is received from the context engine 2110 at the context input processor 602. For example, the context engine DP 250 provides information to the context engine MP 240, which communicates with the policy engine 260 and its context input processor 602 in the policy plane 235.

At block 2804, the policy engine 260 identifies an application from the context information. For example, based on monitored VM 114 data traffic, flow between VMs 114, etc., the policy engine 260 and its context input processor 602 and rules engine 604 identify an application executing on the virtual network.

At block 2806, the policy engine 260 generates a policy regarding the identified application, forming an application entity 302 representing the application running in the data plane 210, for example. For example, the policy generator 608 of the policy engine 260 processes the discovered application and relationship information with respect to rules from the rules engine 604 and options data store 606 and generates a policy definition that describes the application as an entity 302 and its rules, relationships, owner, etc.

At block 2808, the application entity 302 is instantiated in the policy plane 235 based on the policy and context information. For example, the policy definition can be used by the policy engine 260 to generate the application entity 302 for the policy plane 235 (and/or the management plane 230, which can be combined with the policy plane 235 in some examples).

Figure 29:
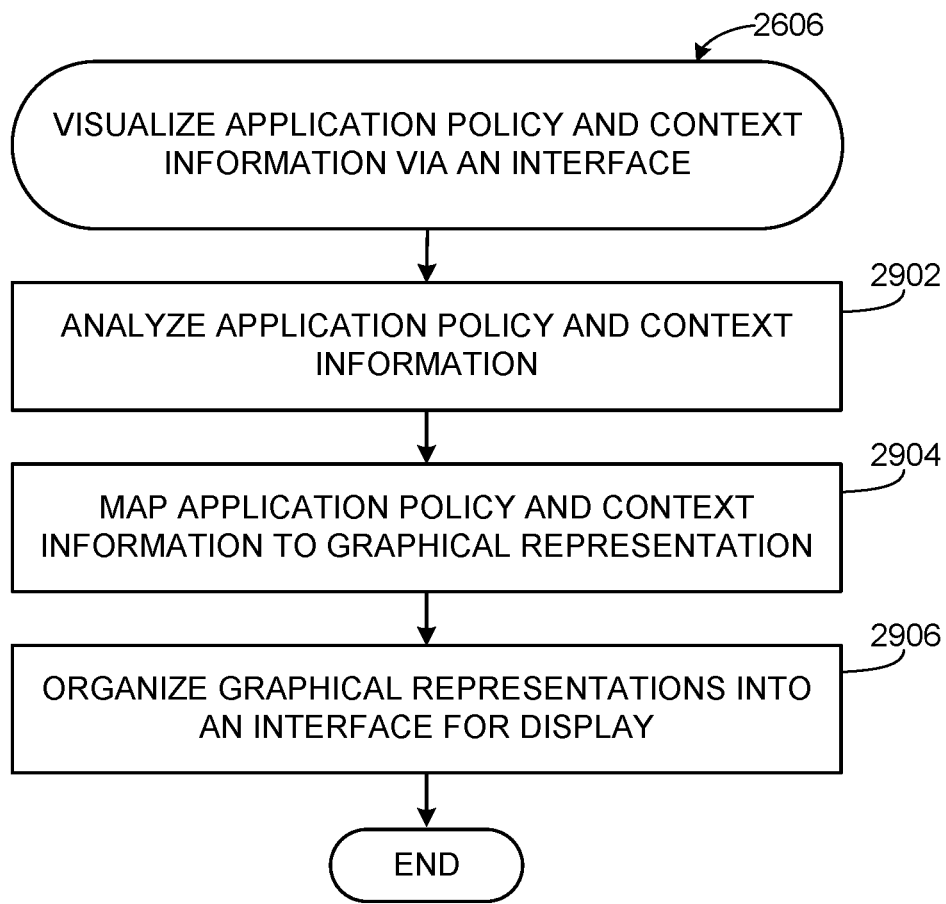

FIG. 29 provides additional example detail regarding visualizing application policy and context information via an interface (block 2606 of the example of FIG. 26). At block 2902, the application entity and policy information is analyzed by the interface generator 610 of the policy engine 260. For example, application(s), VMs 114, flows, connections, etc., are identified in the application entity and policy information from the policy generator 608.

At block 2904, the application entity 302 and policy information are mapped to graphical representations for interactive display. For example, as shown in the example user interfaces of FIGS. 11-20, VM, application, and/or connectivity information can be visualized as a graph, and a user can select an application to view similar applications and interconnections via the interface. At block 2906, the graphical representations are organized into a graphical user interface and display. For example, as shown in the examples of FIGS. 11-20, visualizations can be organized according to user, application, connectivity, flow, etc.

Figure 30:
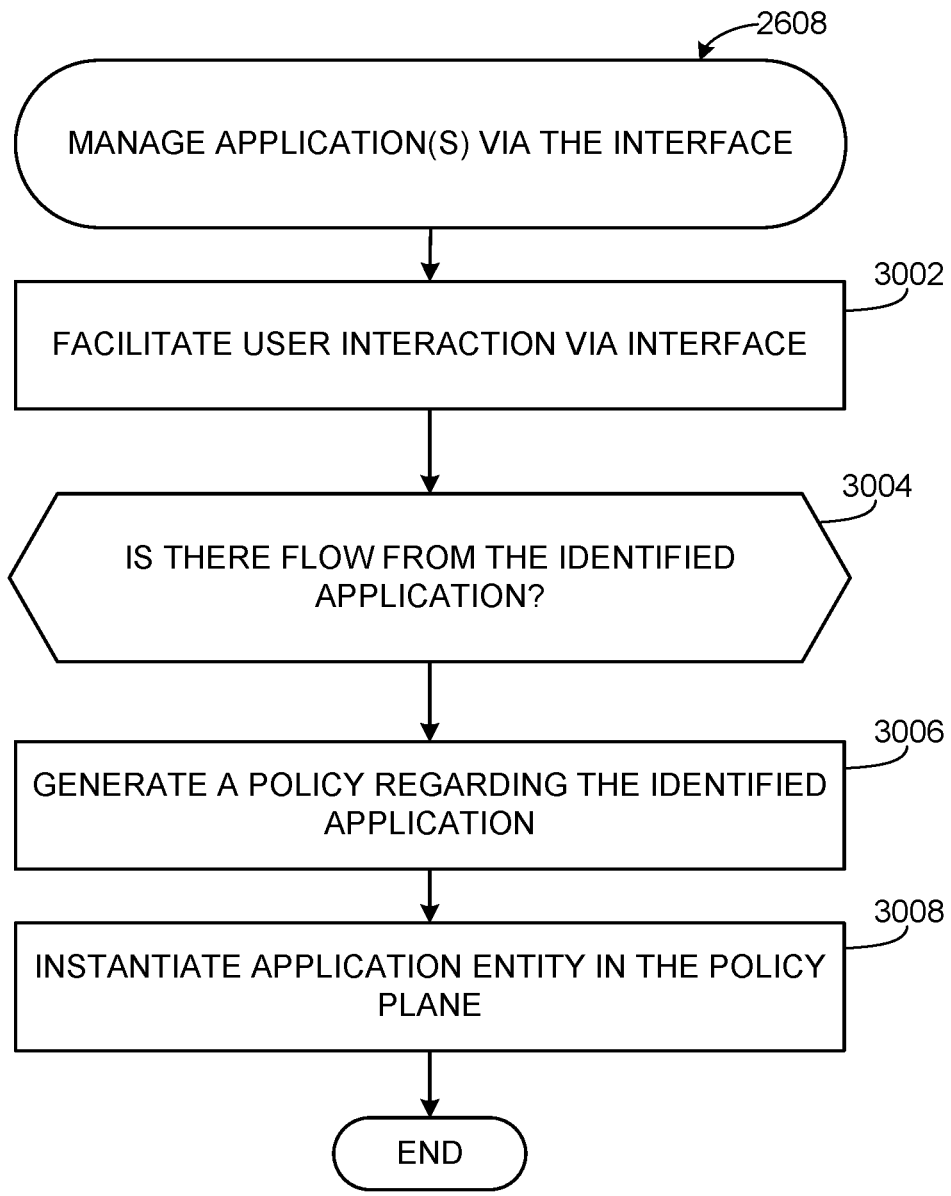

FIG. 30 provides additional example detail regarding managing application(s) via the interface (block 2608 of the example of FIG. 26). At block 3002, user interaction is facilitated via the graphical user interface displayed to a user. For example, a user can select a VM 114, a flow, an application, etc., to retrieve further information, adjust settings, launch functionality, etc. At block 3004, an action received through the interface is identified.

If the action is an informational action (e.g., retrieve and display additional detail), then, at block 3006, additional information is identified with respect to a selected item from the graphical user interface and retrieved for display to the user via the interface. For example, information can be retrieved from a VM 114, service 2130, context store 414, analytics 418, library 532, and/or other repository in response to selection of an interface item.

If the action is a provisioning action, then, at block 3008, one or more VMs 114, networks, etc., can be provisioned, de-provisioned, re-provisioned, etc. For example, the virtual network manager 1102 and/or other manager 110, 138, etc., can be leveraged to provision, de-provision, and/or re-provision a selected VM 114, virtual network, etc. Thus, for example, a virtual network can be provisioned to connect two applications via the interface.

If the action is a configuration action, then, at block 3010, adjustment to an application, VM, network, etc., can be facilitated via the interface. For example, one or more context-based services 2130 can be leveraged to configure virtual network components.

If the action is a blocking action, then, at block 3012, one or more applications, users, and/or other processes can be blocked, quarantined, etc., after identification via the user interface. Thus, for example, if a user has exceeded resource allocation and/or released malware on the system, the user can be blocked via the interface. As another example, an application can be blocked from execution on certain VMs 114 due to permission, etc.

If the action is a template action, then, at block 3014, a template is generated based on the system configuration represented via the interface. For example, VM 114, virtual network, and application entity 302 settings can be captured and saved as a template for ease of replication by the same or other administrator at another point in time. Saved templates can be made available for selection via the interface, for example.

Figure 31:
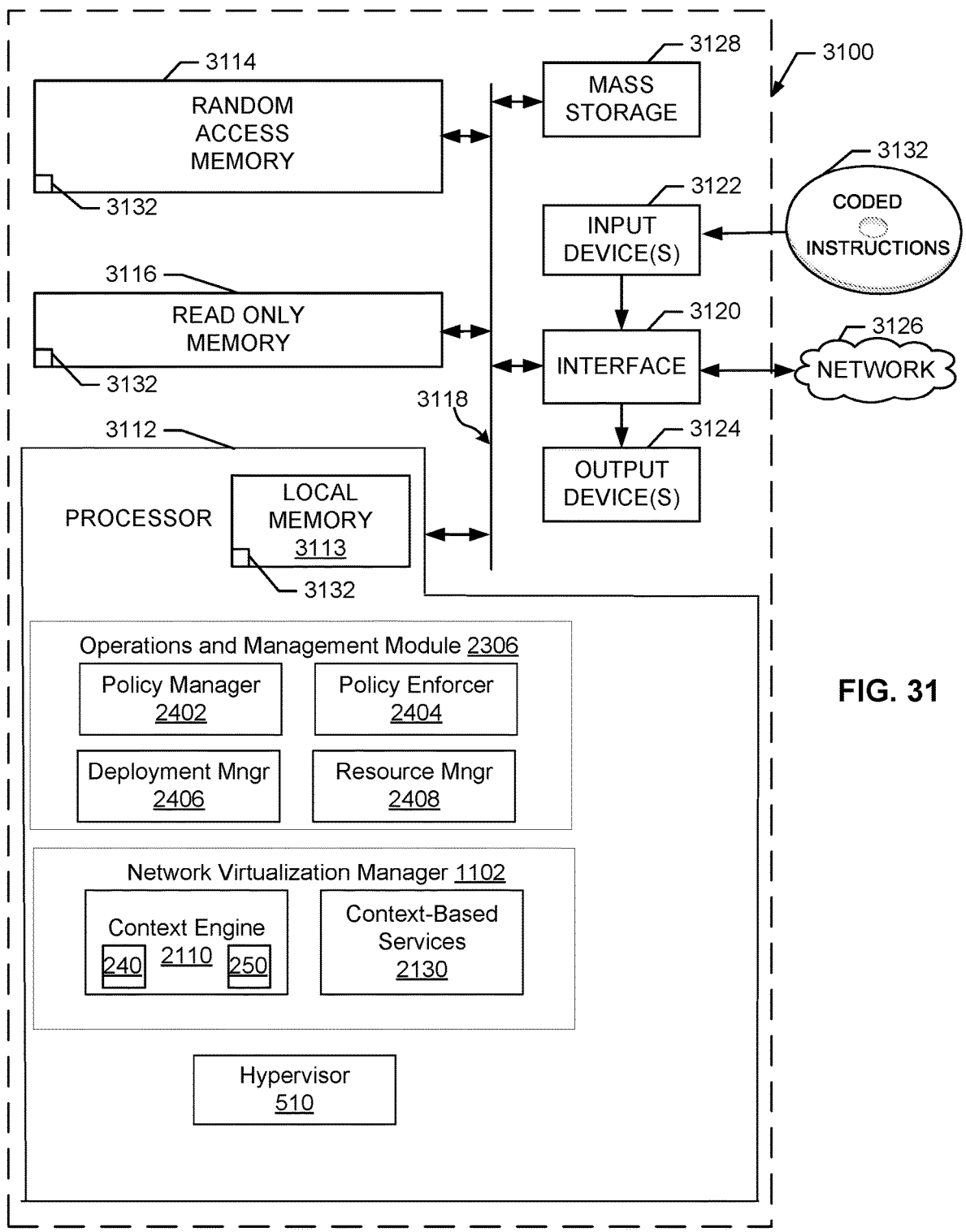
FIG. 31 is a block diagram of an example processing platform structured to execute the example machine-readable instructions of FIGS. 25-30.

FIG. 31 is a block diagram of an example processor platform 3100 structured to execute the instructions of FIGS. 25-30 to implement the example systems, operation, and management of FIGS. 1-24. The processor platform 3100 of the illustrated example includes a processor 3112. The processor 3112 of the illustrated example is hardware. For example, the processor 3112 can be implemented by one or more integrated circuits, logic circuits, microprocessors or controllers from any desired family or manufacturer.

The processor 3112 of the illustrated example includes a local memory 3113 (e.g., a cache), and executes instructions to implement the example systems 100, 110, 200, 1102 or portions thereof, such as the operations and management module 2306, policy engine 260, policy enforcer 2404, deployment manager 2406, resource manager 2410, network virtualization manager 1102, context engine 2110, context engine MP 240, context engine DP 250, context based services 2130, hypervisor 510, VM 114, etc. The processor 3112 of the illustrated example is in communication with a main memory including a volatile memory 3114 and a non-volatile memory 3116 via a bus 3118. The volatile memory 3114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3116 may be implemented by flash memory and/or any other desired type of memory device. Access to the main memory 3114, 3116 is controlled by a memory controller.

The processor platform 3100 of the illustrated example also includes an interface circuit 3120. The interface circuit 3120 may be implemented by any type of interface standard, such as an Ethernet interface, a universal serial bus (USB), and/or a PCI express interface.

In the illustrated example, one or more input devices 3122 are connected to the interface circuit 3120. The input device(s) 3122 permit(s) a user to enter data and commands into the processor 3112. The input device(s) can be implemented by, for example, an audio sensor, a microphone, a keyboard, a button, a mouse, a touchscreen, a track-pad, a trackball, isopoint and/or a voice recognition system.

One or more output devices 3124 are also connected to the interface circuit 3120 of the illustrated example. The output devices 3124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 3120 of the illustrated example, thus, typically includes a graphics driver card, a graphics driver chip or a graphics driver processor.

The interface circuit 3120 of the illustrated example also includes a communication device such as a transmitter, a receiver, a transceiver, a modem and/or network interface card to facilitate exchange of data with external machines (e.g., computing devices of any kind) via a network 3126 (e.g., an Ethernet connection, a digital subscriber line (DSL), a telephone line, coaxial cable, a cellular telephone system, etc.).

The processor platform 3100 of the illustrated example also includes one or more mass storage devices 3128 for storing software and/or data. Examples of such mass storage devices 3128 include flash devices, floppy disk drives, hard drive disks, optical compact disk (CD) drives, optical Blu-ray disk drives, RAID systems, and optical digital versatile disk (DVD) drives.

Coded instructions 3132 representative of the example machine readable instructions of FIGS. 25-30 may be stored in the mass storage device 3128, in the volatile memory 3114, in the non-volatile memory 3116, and/or on a removable tangible computer readable storage medium such as a CD or DVD.

In certain examples, the processor 3112 can be used to implement the host computer 110 and/or components such as the VM 114, network virtualization manager 1102, operations and management component 2306, hypervisor 510, and/or sub-components described above. In certain examples, as discussed herein, the hardware of processor 3112 is virtualized using virtualization such as VMs and/or containers. In the example of FIG. 31, one or more components can be implemented by one or more VMs or containers, so as to virtualize the hardware of processor 3112.

From the foregoing, it will be appreciated that the above disclosed methods, apparatus and articles of manufacture provide new technological capability and improve performance of computing systems and virtual networks through automated identification and evaluation of processes executing on virtual machines in a system. Certain examples overcome the technical hurdle of operating in a policy plane to instantiate and manage application entities for configuration, reporting, network and/or VM provisioning, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 memory including instructions; and
 processor circuitry to execute the instructions to implement at least:
 a context engine management plane (MP) in a management plane of a network, the context engine MP to extract first context information in the management plane to implement a context-based service; and
 a context engine data plane (DP) in a data plane of the network, the context engine DP to extract second context information in the data plane to implement a context-based service plugin,
 the context-based service to communicate with the context-based service plugin to exchange the first context information and the second context information to drive a workflow associated with the context-based service in both the management plane and the data plane.

2. The apparatus of claim 1, wherein the context engine DP is to extract the second context information from a virtual machine in the data plane to drive the workflow.

3. The apparatus of claim 2, wherein the virtual machine includes an agent to execute at least a portion of the workflow in the virtual machine.

4. The apparatus of claim 1, wherein at least one of the context engine MP or the context engine DP is to leverage a guest introspection framework to determine at least one of an application, a user, or a process operating with the first context information and the second context information.

5. The apparatus of claim 1, wherein at least one of the context engine MP or the context engine DP is to generate a visualization of the first context information and the second context information.

6. The apparatus of claim 1, wherein at least one of the context engine MP or the context engine DP is to push collected contextual attributes to the context-based service.

7. The apparatus of claim 1, wherein the context-based service plugin is to generate an identity-based firewall based on the second context information to block traffic from a source to a destination.

8. The apparatus of claim 1, wherein the context engine MP is to provide a threat level indicator to the context-based service to identify one or more service rules to enforce with respect to the workflow.

9. The apparatus of claim 1, further including an attribute storage to store the first context information and the second context information.

10. The apparatus of claim 1, further including a context-based load balancer to distribute the workflow based on at least one of the first context information or the second context information.

11. A tangible computer readable storage medium comprising instructions which, when executed by a processor, cause the processor to at least:
implement a context-based service in a management plane of a network using first context information extracted in the management plane by a context engine management plane (MP);
implement a context-based service plugin in a data plane of the network using second context information extracted in the data plane by a context engine data plane (DP); and
facilitate a workflow associated with the context-based service in both the management plane and the data plane through communication between the context-based service and the context-based service plugin to exchange the first context information and the second context information.

12. The computer readable storage medium of claim 11, wherein the instructions, when executed, cause the context engine DP to extract the second context information from a virtual machine in the data plane to drive the workflow.

13. The computer readable storage medium of claim 11, wherein the instructions, when executed, cause at least one of the context engine MP or the context engine DP to leverage a guest introspection framework to determine at least one of an application, a user, or a process operating with the first context information and the second context information.

14. The computer readable storage medium of claim 11, wherein the instructions, when executed, cause at least one of the context engine MP or the context engine DP to generate a visualization of the first context information and the second context information.

15. The computer readable storage medium of claim 11, wherein the instructions, when executed, cause the context-based service plugin to generate an identity-based firewall based on the second context information to block traffic from a source to a destination.

16. The computer readable storage medium of claim 11, wherein the instructions, when executed, cause the context engine MP to provide a threat level indicator to the context-based service to identify one or more service rules to enforce with respect to the workflow.

17. A method comprising:
implementing a context-based service in a management plane of a network using first context information extracted in the management plane using a context engine management plane (MP);
implementing a context-based service plugin in a data plane of the network using second context information extracted in the data plane using a context engine data plane (DP); and
facilitating a workflow associated with the context-based service in both the management plane and the data plane through communication between the context-based service and the context-based service plugin to exchange the first context information and the second context information.

18. The method of claim 17, wherein the second context information is extracted from a virtual machine in the data plane to drive the workflow, and further including leveraging a guest introspection framework to determine at least one of an application, a user, or a process operating with the first context information and the second context information.

19. The method of claim 17, further including generating a visualization of the first context information and the second context information.

20. The method of claim 17, further including generating an identity-based firewall based on the second context information to block traffic from a source to a destination.

21. The method of claim 17, further including providing a threat level indicator to the context-based service to identify one or more service rules to enforce with respect to the workflow.

* * * * *